US011866955B2

(12) United States Patent
More et al.

(10) Patent No.: US 11,866,955 B2
(45) Date of Patent: Jan. 9, 2024

(54) PORTABLE AND MODULAR ENCLOSURE FOR ENGINE GENERATOR SET

(71) Applicant: Cummins Power Generation Inc., Minneapolis, MN (US)

(72) Inventors: Shashikant Ramdas More, Minneapolis, MN (US); Atin Tandon, Greenwood, IN (US); Abdullah Caner Demirdogen, Greenwood, IN (US)

(73) Assignee: Cummins Power Generation Inc., Minneapolis, MN (US)

( * ) Notice: Subject to any disclaimer, the term of this patent is extended or adjusted under 35 U.S.C. 154(b) by 170 days.

(21) Appl. No.: 17/488,972

(22) Filed: Sep. 29, 2021

(65) Prior Publication Data

US 2022/0098886 A1 Mar. 31, 2022

Related U.S. Application Data

(60) Provisional application No. 63/085,463, filed on Sep. 30, 2020.

(51) Int. Cl.

| | |
|---|---|
| ***E04H 5/02*** | (2006.01) |
| ***E04B 1/24*** | (2006.01) |
| ***F02B 63/04*** | (2006.01) |

(52) U.S. Cl.

CPC ............ *E04H 5/02* (2013.01); *E04B 1/2403* (2013.01); *F02B 63/048* (2013.01);

(Continued)

(58) Field of Classification Search

CPC ........... E04B 1/2403; E04B 2001/2415; E04B 1/34321; E04B 2001/2481; E04H 5/02; F02B 2063/045; F02B 63/048

(Continued)

(56) References Cited

U.S. PATENT DOCUMENTS 1,208,326 A * 12/1916 Kane ..................... E04D 13/158 52/592.4
2,482,918 A * 9/1949 Kump, Jr. ........... E04B 1/34815 52/762

(Continued)

FOREIGN PATENT DOCUMENTS

CN 103628710 3/2014
CN 105351090 2/2016

OTHER PUBLICATIONS

International Search Report and Written Opinion on PCT/US2021/052594 dated Jan. 25, 2022.

(Continued)

*Primary Examiner* — Brian E Glessner
*Assistant Examiner* — Adam G Barlow
(74) *Attorney, Agent, or Firm* — Foley & Lardner LLP

(57) ABSTRACT

A genset enclosure includes a skid platform, a plurality of gusset members, a plurality of roof supports, and a first and second plurality of sidewall panels. The gusset members are spaced along an outer perimeter of the skid platform and are coupled to the skid platform using fasteners. The gusset members are arranged in opposed pairs positioned on opposite lateral ends of the skid platform. Each gusset member defines a first portion extending upwardly from the skid platform normal to an upper surface of the skid platform and a second portion disposed at an upper end of the first portion and extending normal to the first portion and toward a centerline of the skid platform. The gusset members support the plurality of roof supports and the first and second plurality of sidewall panels to form an enclosed volume.

19 Claims, 16 Drawing Sheets

(52) U.S. Cl.
CPC ................. *E04B 2001/2415* (2013.01); *E04B 2001/2481* (2013.01); *F02B 2063/045* (2013.01)

(58) Field of Classification Search
USPC ................................ 52/79.1, 93.1, 93.4, 106
See application file for complete search history.

(56) References Cited

U.S. PATENT DOCUMENTS 2,611,454 A * 9/1952 Arehart ................. E04B 1/3447 52/630
2,638,637 A * 5/1953 Kump, Jr. ................. E04C 3/42 52/690
2,713,924 A * 7/1955 Tripp .................... E04B 1/5812 403/189
3,191,238 A * 6/1965 Olson ....................... E04C 3/42 144/346
3,414,300 A * 12/1968 Spane ................... E04B 1/2604 403/402
3,530,624 A * 9/1970 Fones ....................... E04H 6/44 52/73
3,561,633 A * 2/1971 Morrison ............. B65D 88/121 403/231
3,717,964 A * 2/1973 Brown ...................... E04B 5/10 52/690
3,820,476 A 6/1974 Harter et al.
4,041,659 A * 8/1977 McElhoe ................ E06B 3/721 52/639
4,117,342 A 9/1978 Melley, Jr.
4,342,177 A * 8/1982 Smith ....................... E04C 3/40 403/387
4,854,104 A * 8/1989 Pomento ................... E04C 3/42 52/642
4,995,214 A * 2/1991 Wolf ......................... E04B 1/26 52/657
5,660,005 A * 8/1997 Tacoma .................. E04B 7/022 52/273
6,016,634 A * 1/2000 Sayer .................... E04B 1/2403 52/648.1
6,327,823 B1 * 12/2001 Emms ................... E04B 1/2403 52/273
6,415,557 B1 * 7/2002 McCalley ................. E04H 9/14 52/584.1
6,810,628 B2 * 11/2004 Emms ....................... E04C 3/40 52/93.2
7,827,738 B2 * 11/2010 Abrams .................... E04H 1/04 52/79.1
8,001,730 B2 * 8/2011 Wallance ............ E04B 1/34331 52/79.1
8,439,333 B2 * 5/2013 Shepherd .............. B05B 15/658 261/78.2
8,769,908 B1 * 7/2014 Santini ...................... E04C 2/38 52/270
8,870,166 B2 * 10/2014 Shepherd ............... B01D 53/78 261/78.2
8,872,366 B2 10/2014 Campion et al.
9,212,499 B1 12/2015 Maurer
9,957,708 B2 5/2018 Brewer et al.
10,079,526 B2 9/2018 Shatek et al.
10,202,896 B2 2/2019 Brewer et al.
10,260,409 B2 * 4/2019 Johnson ................ F02B 63/044
10,407,989 B2 * 9/2019 Morrell ...................... E04H 5/02
10,731,329 B1 * 8/2020 Novikov ............... E04B 1/3483
2003/0192263 A1 * 10/2003 Kasinger .................. A01G 9/16 52/79.1
2008/0134589 A1 * 6/2008 Abrams .............. E04B 1/34807 52/79.1
2009/0217617 A1 9/2009 Kennedy et al.
2011/0239548 A1 * 10/2011 Laurent ............... E04B 1/34838 52/79.1
2013/0192146 A1 * 8/2013 Anklam ................ E04H 1/1205 52/79.5
2014/0202505 A1 * 7/2014 Cotton ...................... B60S 3/04 134/57 R
2015/0240474 A1 * 8/2015 Kokoschka ......... E04B 1/34384 52/745.02
2016/0024779 A1 * 1/2016 Clus .......................... E04B 5/02 52/79.1
2016/0160515 A1 * 6/2016 Wallance ................ E04F 10/10 52/745.02
2017/0222598 A1 * 8/2017 Campbell ........... E04B 1/34336
2018/0123349 A1 * 5/2018 Gleave .................. F02B 63/044
2019/0120134 A1 * 4/2019 Goleczka .............. F02B 63/044
2019/0353081 A1 * 11/2019 Sarder ....................... F01P 5/04

OTHER PUBLICATIONS

Commercial Acoustics, Brochure—Custom Generator Enclosures: Modular Acoustical Plenums, www.mfmca.com, accessed Dec. 11, 2020, 3 pages.
Freeman Enclosure Systems, LLC, Enclosures, https://freemanenclosures.com/products/cenclosures/, accessed Dec. 11, 2020, 3 pages.
Panel Built Incorporated, Generator Enclosures, www.panelbuilt.com, accessed Dec. 11, 2020, 1 page.
International Preliminary Report on Patentability in PCT/US2021/052594 dated Mar. 28, 2023, 7 pages.

* cited by examiner

PORTABLE AND MODULAR ENCLOSURE FOR ENGINE GENERATOR SET

CROSS-REFERENCE TO RELATED PATENT APPLICATIONS

This application claims the benefit of and priority to U.S. Provisional Application No. 63/085,463, filed Sep. 30, 2020, which is hereby incorporated by reference in its entirety.

TECHNICAL FIELD

The present disclosure relates generally to enclosures for housing engines and generators.

BACKGROUND

Generator sets (also known as "gensets") may be employed for physical power production in a variety of applications (e.g., standby/backup power applications, etc.). A genset typically includes an engine and an electric power generator coupled to the engine. The engine is structured to mechanically drive the generator which, in turn, can produce electricity. The engine and the generator may be housed within an enclosure that allows the genset to operate outdoors, and to tolerate environmental extremes of temperature, humidity, precipitation (e.g., rain, snow, ice, etc.), and other factors. In some instances, the enclosures are made from intermodal containers (e.g., ISO containers, cargo containers, shipping containers, etc.) that are sized to contain the entire genset and any auxiliary equipment that is needed to operate the genset (e.g., cooling equipment, etc.). However, because of the limited availability of different container sizes, the footprint of the entire genset system is typically larger than required. In other words, these containers may need to be oversized to ensure that the enclosure can accommodate the entire genset system. Additionally, the standard-sized intermodal containers cannot be easily modified to accommodate different cooling systems or auxiliary equipment that may be used with the genset.

SUMMARY

One embodiment of the present disclosure relates to a genset enclosure. The genset enclosure includes a skid platform, a plurality of gusset members, a plurality of roof supports, a first plurality of sidewall panels, and a second plurality of sidewall panels. The gusset members are spaced at intervals along an outer perimeter of the skid platform and are coupled to the skid platform using fasteners. The gusset members are arranged in opposed pairs positioned on opposite lateral ends of the skid platform. Each gusset member defines a first portion extending upwardly from the skid platform normal to an upper surface of the skid platform and a second portion disposed at an upper end of the first portion and extending normal to the first portion and toward a centerline of the skid platform. The plurality of roof supports extends between at least one of the opposed pairs of gusset members and couples upper ends of the at least one opposed pair of gusset members. The plurality of roof supports and the plurality of gusset members together define a skeletal framework for the genset enclosure. The first plurality of sidewall panels is coupled to both the plurality of gusset members and the skid platform and extends upwardly from an outer perimeter of the skid platform normal to the upper surface of the skid platform. The first plurality of sidewall panels and the gusset members are positioned in alternating arrangement along the outer perimeter of the skid platform. The second plurality of sidewall panels is coupled to the plurality of roof supports. The first plurality of sidewall panels and the second plurality of sidewall panels together define an enclosed volume.

Another embodiment of the present disclosure relates to a method of making a genset enclosure. The method includes providing a skid platform; mounting a generator system to the skid platform; fastening a first plurality of sidewall panels to the plurality of gusset members and the skid platform; fastening a plurality of roof supports to the plurality of gusset members; between upper ends of laterally opposed pairs of the plurality of gusset members, to define a skeletal framework; and fastening a second plurality of sidewall panels to the plurality of roof supports to define an at least partially enclosed volume between the second plurality of sidewall panels and the skid platform.

Yet another embodiment of the present disclosure relates to a genset enclosure. The genset enclosure includes a skid platform subassembly, a plurality of gusset members, a plurality of roof supports, and a first and second plurality of sidewall panels. The plurality of gusset members are mountable to the skid platform subassembly. At least one of the plurality of gusset members includes a first portion, a second portion disposed at an end of the first portion and extending normal to the first portion, and a flange disposed on the second portion and extending normal to the first portion and the second portion. The plurality of roof supports are mountable to the plurality of gusset members. The first plurality of sidewall panels are mountable to the plurality of gusset members, and the second plurality of sidewall panels are mountable to the plurality of roof supports.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 2:
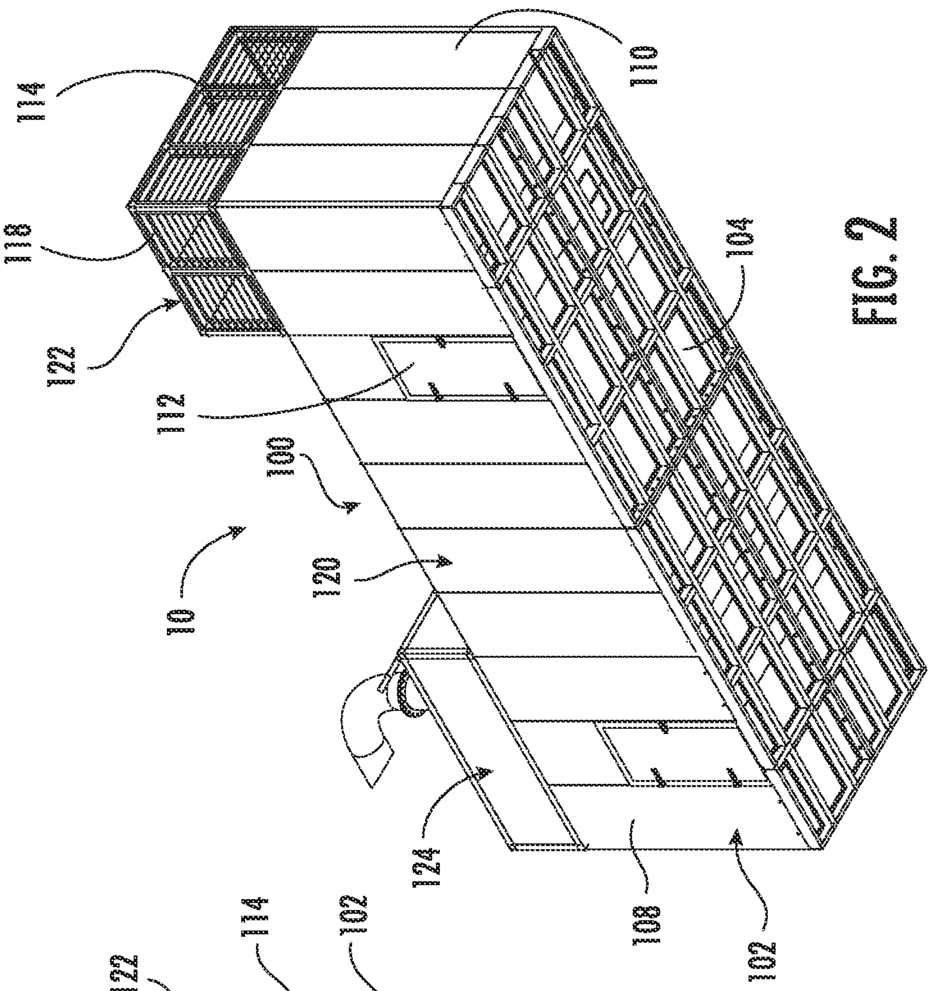
FIG. 2 is a bottom perspective view of the genset enclosure of FIG. 1.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to methods and devices for forming a genset enclosure. In particular, embodiments described herein relate generally to a field-erectable and modular genset enclosure that is assembled without the use of welding or other complex manufacturing operations. The genset enclosure may be assembled using removable mechanical fasteners that allow for modifications to the size and configuration of the genset enclosure after it has been assembled. The genset enclosure includes a plurality of inwardly facing "L" shaped gusset members that are arranged in pairs on opposing lateral ends of a platform. Upper ends of each pair of gusset members are connected by roof supports to define a skeletal framework above the platform. Walls of the enclosure are formed by panels that are applied to the gusset members and roof supports to enclose the space surrounded by the skeletal framework. In one embodiment, the gusset members are plates that are "sandwiched" between a pair of sidewall panels, to reduce the overall size and weight of the skeletal framework. Among other benefits, the enclosure may be at least partially assembled on site (in the field, at a location where the genset will be installed, etc.). For example, the gusset members, roof supports, and sidewall panels may be shipped as separate components and assembled on-site to customize the design of the genset enclosure based to its surroundings (e.g., based on where the enclosure is located, the position of the enclosure in relation to neighboring structures, etc.) and the needs of the end user.

The spacing between gusset members may be adjusted to accommodate access doors for the genset enclosure at any position along the perimeter of the genset enclosure. In one embodiment, the spacing between gusset members is equal to a width of an access door such that the door may be repositioned to any location along the perimeter (or the roof of the genset enclosure) without having to disassemble the skeletal framework. The size of the genset enclosure may be adjusted by extending the length of the platform and adding more gusset members and sidewall panels. The genset enclosure can therefore be readily modified to accommodate different engine gensets sizes/types and/or auxiliary equipment (e.g., cooling equipment, controls, etc.) within one common enclosure footprint. This construction also provides a more compact overall footprint because the size of the panels may be modified (and the spacing between adjacent gusset members) to reduce unused space within the enclosure. The amount of material required for the genset enclosure may therefore be less than intermodal container constructions that may be used to house gensets of similar size. Additionally, because of the modular construction of the genset enclosure, the enclosure can be quickly and easily disassembled into sections (e.g., segments including multiple interconnected pieces or individual components) to transport the enclosure between locations. The genset enclosure is also expandable to accommodate changes to the genset and/or additional auxiliary equipment.

In some embodiments, the enclosure segments and construction techniques are also employed to form the air intake and discharge portions of the enclosure. The various concepts introduced above and discussed in greater detail below may be implemented in any of numerous ways, as the described concepts are not limited to any particular manner of implementation. Examples of specific implementations and applications are provided primarily for illustrative purposes.

Various numerical values herein are provided for reference purposes only. Unless otherwise indicated, all numbers expressing quantities of properties, parameters, conditions, and so forth, used in the specification and claims are to be understood as being modified in all instances by the term "approximately." Accordingly, unless indicated to the contrary, the numerical parameters set forth in the following specification and attached claims are approximations. Any numerical parameter should at least be construed in light of the number reported significant digits and by applying ordinary rounding techniques. The term "approximately" when used before a numerical designation, e.g., a quantity and/or an amount including range, indicates approximations which may vary by (+) or (−) 10%, 5%, or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

Figure 1:
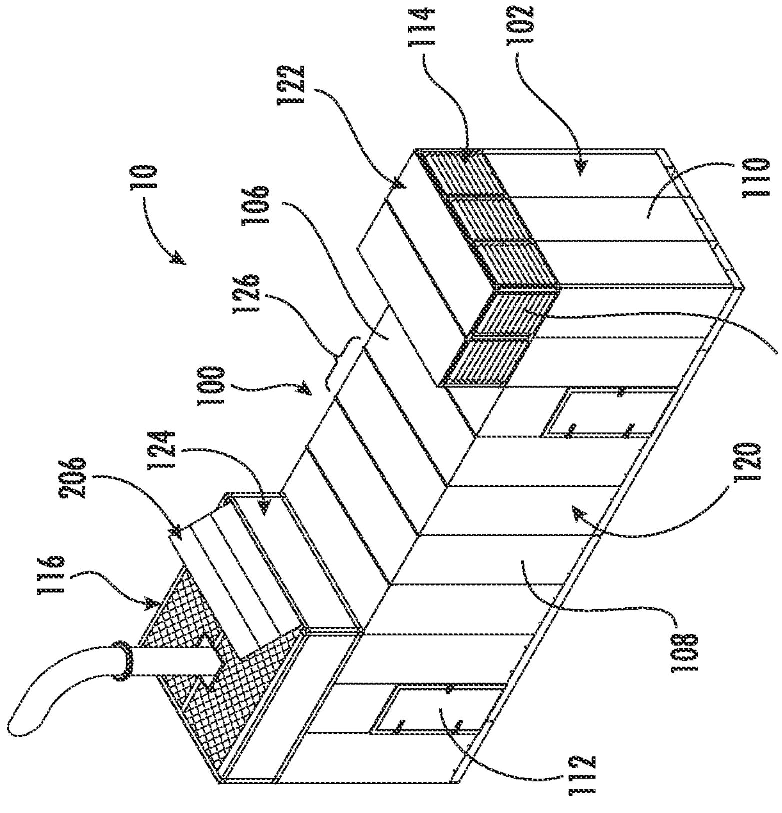
FIG. 1 is a top perspective view of a genset enclosure, according to an embodiment.
Figure 3:
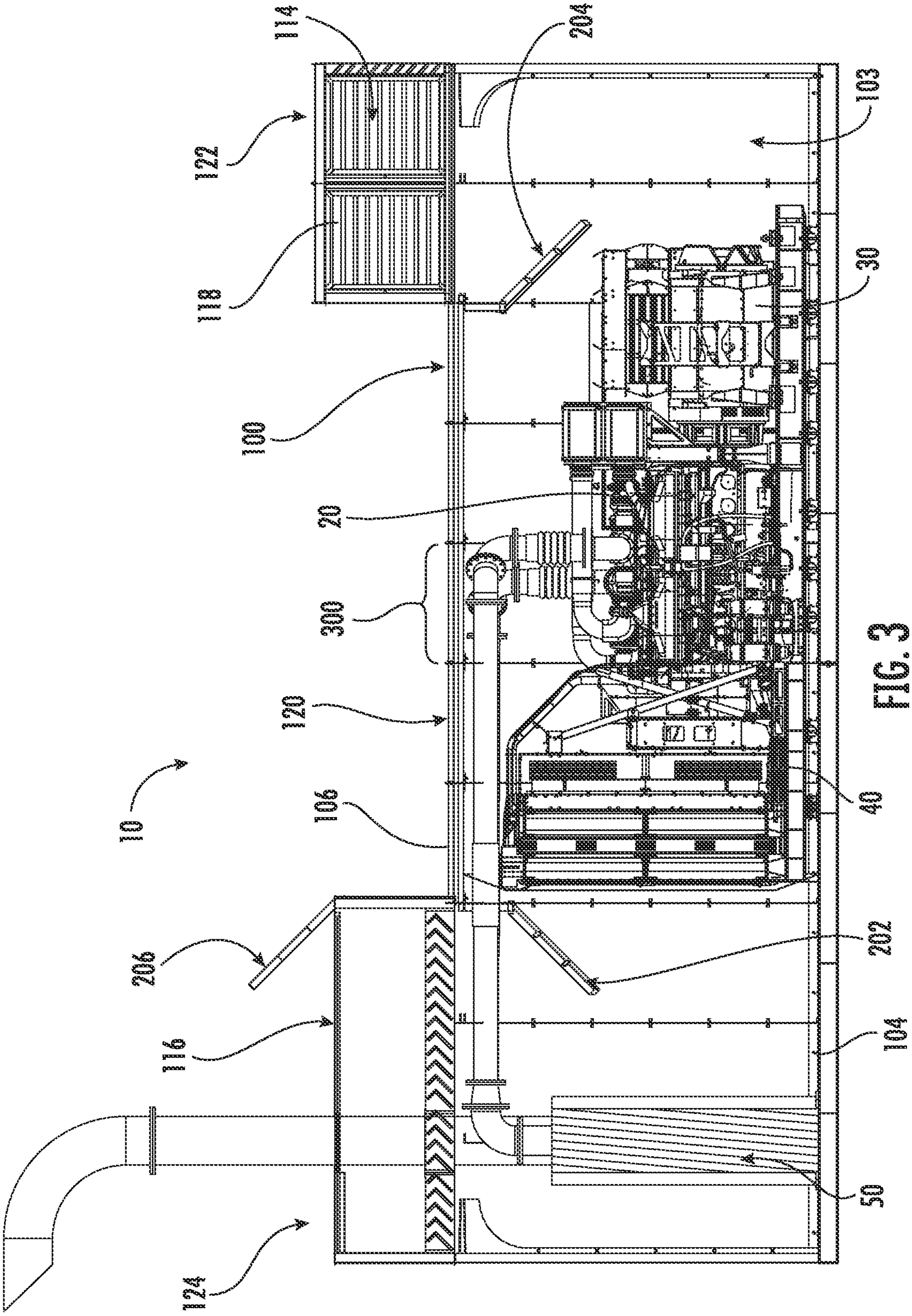
FIG. 3 is a side cross-sectional view of a genset positioned within the genset enclosure of FIG. 1.

FIGS. 1-3 show various views of a genset assembly 10, according to at least one embodiment. The genset assembly 10 includes (as shown in FIG. 3) an engine 20; a generator 30; an air driver 40; an exhaust assembly 50; and a genset enclosure, shown as enclosure 100. The engine 20 may be a diesel engine, a gasoline engine, a natural gas engine, a dual fuel engine, a biodiesel engine, an E85 engine, a flex fuel engine, a gas turbine, or another type of internal combustion engine or driver. In various embodiments, the engine 20 may be a high horse power (HHP) engine, such as, for example, an engine capable of providing power in the range of 500 hp to 4,500 hp or more. The generator 30 may be an electric power generator, an alternator, or the like. In one embodiment, the engine 20 is coupled to the generator 30 by, for example, a driveshaft (not shown). In operation, the engine 20 drives the generator 30 to produce electricity (e.g., power). Embodiments of the present disclosure are also applicable for various types of prime movers (mechanical, electrical, hydro, and/or fuel cell types) with various power strengths (low, medium, and high horse power).

The air driver 40 is structured to draw air (e.g., ventilation air, cooling air, etc.) from an environment surrounding the enclosure 100 through the enclosure 100 to cool the generator 30 and/or other internal components of the genset assembly 10. In at least one embodiment, the air driver 40 is a fan. In other embodiments, the air driver 40 includes a plurality of fans positioned at different locations within the enclosure 100. In some embodiment, the fan may be coupled to the engine 20 (e.g., to the engine driveshaft via a pulley, etc.) such that a speed of the fan is proportional to a speed of the engine 20. In other embodiments, the fan is driven separately from the engine 20 (e.g., via an electric fan motor, etc.).

The exhaust assembly 50 forms part of the engine 20 and is structured to direct exhaust gasses from the engine 20 out of the enclosure 100. The exhaust assembly 50 may include a plurality of mufflers 52 for attenuating noise produced by the engine 20. As shown in FIGS. 1-3, because the enclosure is assembled in sections from discrete components, so as to be modular in construction, the enclosure 100 can be resized on-site to accommodate the exhaust assembly 50 therein. This enclosure configuration may reduce the likelihood of weather-related damage to components of the exhaust assembly 50 (e.g., the mufflers, connecting pipes, support brackets, etc.) and allows the components of the exhaust assembly 50 to be made from less expensive materials such as steel rather than typical weather-proof materials such as aluminum. In the embodiment of FIG. 3, the mufflers of the exhaust assembly 50 are disposed beneath the air outlet 116, within a region that is circumscribed by the air outlet 116 when viewed from above the enclosure 100. An exhaust pipe of the exhaust assembly 50 is substantially concentric with the body of the muffler and extends upwardly in a vertical direction through the air outlet 116. An intermediate pipe that connects the muffler to the engine 20 extends in a longitudinal direction (e.g., a horizontal direction, left-to-right as shown in FIG. 3, etc.) just below a container roof 106 of the enclosure 100, through a vertical space between a first deflector assembly 202 and the container roof 106.

Figure 5:
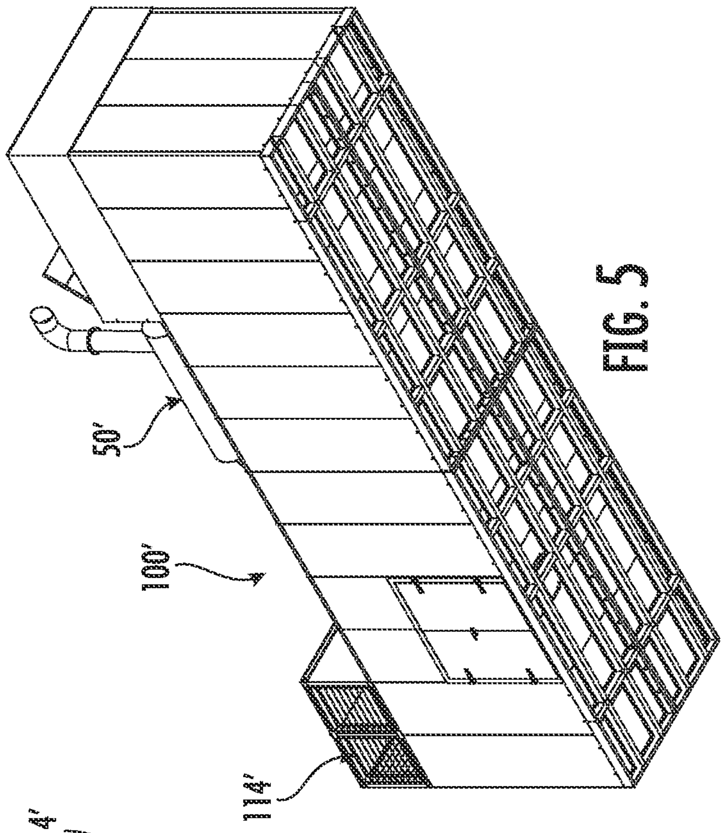
FIG. 5 is a bottom perspective view of the genset enclosure of FIG. 1, according to an embodiment.
Figure 4:
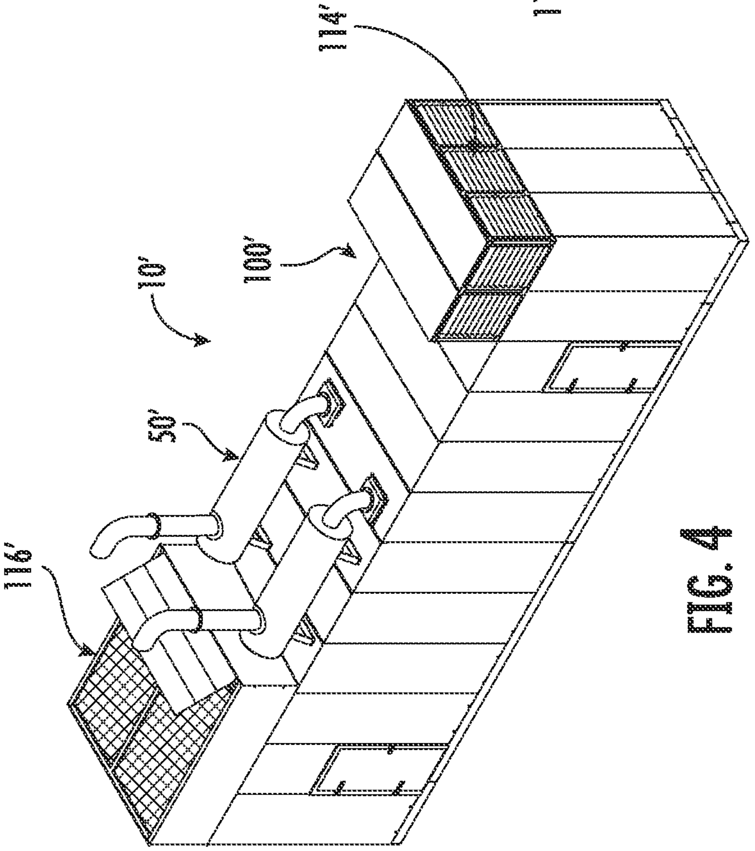
FIG. 4 is a top perspective view of a genset enclosure, according to another embodiment.
Figure 6:
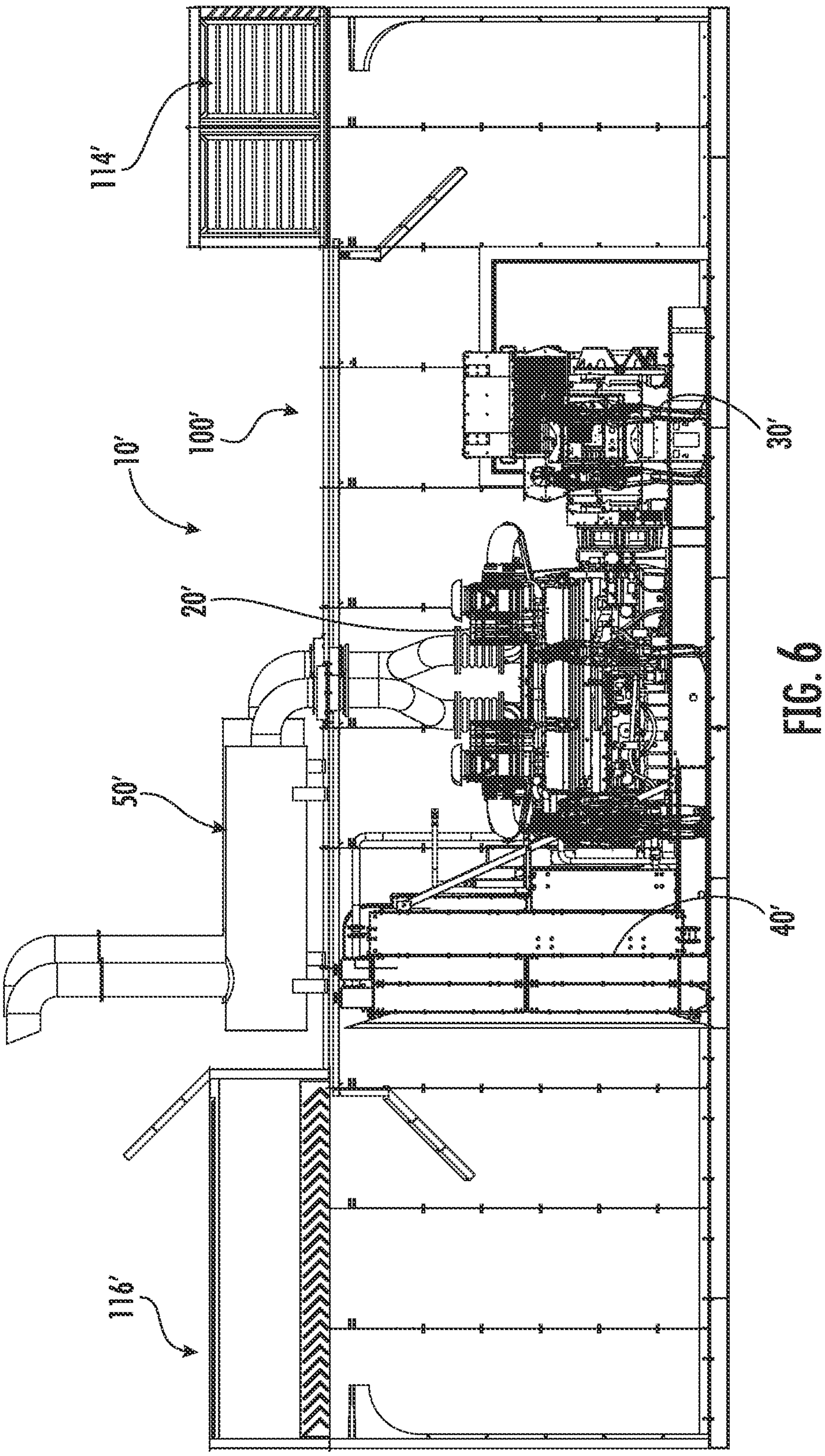
FIG. 6 is a side cross-sectional view of a genset positioned within the genset enclosure of FIG. 4.

The configuration and arrangement of the engine 20, generator 30, air driver 40, and exhaust assembly 50 shown in FIGS. 1-3 should not be considered limiting. Many alternatives and combinations are possible without departing from the inventive concepts disclosed herein. For example, FIGS. 4-6 show a genset assembly 10' having an exhaust assembly 50' that is disposed on a roof of the enclosure 100', proximate to an air outlet 116' of the enclosure 100' (e.g., closer to the air outlet 116' than the air inlet 114'). In another embodiment, the position of the exhaust assembly 50' along the roof of the enclosure 100' may be different. As shown in FIG. 6, each muffler of the exhaust assembly 50' is connected to the engine 20' by intermediate pipes that extend upwardly through the roof. The mufflers are supported by brackets that space the mufflers a distance above the container roof.

Returning to FIGS. 1-2, top and bottom perspective views, respectively, of the enclosure 100 are shown. The enclosure 100 includes an end wall structure including end walls 102 (e.g., container walls, sidewalls, etc.) defining an internal volume 103 (e.g., an enclosed space, a hollow region, etc. as shown in FIG. 1) for housing the engine 20, the generator 30, the air driver 40, the exhaust assembly 50, and other genset components (see also FIG. 1). The end walls 102 include a container floor 104, a container roof 106, a first pair of container sidewalls 108, and a second pair of container sidewalls 110. Each sidewall of the first pair of container sidewalls 108 is disposed at a lateral end of the enclosure 100, while each sidewall of the second pair of container sidewalls 110 is disposed at a longitudinal end of the enclosure 100. The first pair of container sidewalls 110 and the second pair of container sidewalls 110 together form an enclosure having a substantially rectangular cross-sectional shape. The first pair of container sidewalls 108 and the second pair of container sidewalls 110 are arranged in substantially perpendicular orientation relative to the container floor 104 and container roof 106. The container floor 104 and the container roof 106 are engaged with the container sidewalls 108 along lateral and longitudinal edges of the container floor 104 and the container roof 106 (e.g., to upper and lower edges of the container sidewalls 108). At least one door 112 may be provided in at least one of the first plurality of container sidewalls 108, the second pair of container sidewalls 110, and/or the container roof 106 to allow access to the genset assembly 10 (e.g., by maintenance or repair personnel, operators, etc.). The at least one door 112 allows such personnel to enter the internal volume 103 defined by the enclosure 100 and access other parts of the genset assembly 10. The container floor 104, the container roof 106, the first plurality of container sidewalls 108, and the second pair of container sidewalls 110 together form a substantially weather-proof seal between the internal volume 103 and the surrounding environment. The container floor 104, container roof 106, the first plurality of container sidewalls 108, and the second plurality of container sidewalls 110 may be formed from any suitable material, for example, carbon or mild steel panels, and the like.

In some embodiments, the enclosure 100 may be disposed on the ground. In other embodiments, the enclosure 100 may be mounted on a fuel tank (not shown) that is disposed on the ground, or mounted on skids (not shown) that are disposed on the ground. In other embodiments, the enclosure 100 may be positioned on a rooftop above the ground or another suitable location.

The enclosure 100 is configured to provide air flow therethrough to cool components housed within the enclosure 100 and provide intake air for the engine 20 (see FIG. 3) of the genset assembly 10. As shown in FIGS. 1-2, the enclosure 100 includes ventilation air openings including a ventilation air intake opening, shown as air inlet 114, and a ventilation air outlet opening, shown as air outlet 116. In at least one embodiment, each of the air inlet 114 and the air outlet 116 are defined in the container roof 106 and fluidly couple the internal volume 103 with an environment surrounding the enclosure 100. In the embodiment of FIGS. 1-3, the air inlet 114 and the air outlet 116 are disposed on opposite ends of the container roof 106. The air inlet 114 is disposed along a perimeter of an air inlet assembly, which extends upwardly from the container roof 106 at a first end of the container roof 106. The air outlet 116 is disposed on an opposing end of the container roof 106 from the air inlet 114 and faces upwardly from the container roof 106 (e.g., toward the sky, etc.). The engine 20, the generator 30, and the air driver 40 are disposed between the air inlet 114 and the air outlet 116, between two deflector assemblies 202, 204, as will be further described.

Air enters the enclosure 100 in a radial direction through the air inlet 114, and is directed in a longitudinal direction through the enclosure 100. Air passes across the genset (e.g., the engine 20, the generator 30, etc.) and then is directed in at a vertical direction (e.g., upwardly at an approximately 90° angle relative to the longitudinal direction), and is discharged through the air outlet 116 in the container roof 106. Among other benefits, the air flow path provided by the design of the enclosure 100, when used with air deflection plates, has been found to significantly reduce the noise that is generated due to air flow through the enclosure 100. In some embodiments, the air inlet 114 and/or the air outlet 116 may include louvers 118 or other elements that allow air to enter the enclosure 100, while redirecting water (e.g., due to rainfall) away from the enclosure 100 and/or to predefined water drainage areas of the enclosure 100. In other embodiments, the air inlet 114 and the air outlet 116 may be provided in another location along the enclosure 100 (e.g., the first pair of container sidewalls 108 and/or the second pair of container sidewalls 110).

The genset enclosure 100 also includes a deflector assembly structured to redirect noise in the air multiple times within the enclosure 100 and near the air outlet 116 of the enclosure 100 to attenuate noise exported from the enclosure 100. As shown in FIG. 3, the genset enclosure 100 includes two interior deflector assemblies, including a first deflector assembly 202 and a second deflector assembly 204. The second deflector assembly 204 is disposed within the enclosure 100 on an opposite end of the enclosure 100 as the first deflector assembly 202. The first deflector assembly 202 and the second deflector assembly 204 are mechanically connected to the container roof 106, as will be further described. In the embodiment of FIG. 3, the first deflector assembly 202 is an outlet deflector assembly structured to reflect air proximate to the air outlet 116, as the air is redirected upwardly toward the air outlet 116, while the second deflector assembly 204 is an inlet deflector assembly structure to reflect air proximate to the air inlet 114, after entering the air inlet 114 as the air is redirected in a longitudinal direction across the engine 20 and generator 30.

The deflector assemblies 202, 204 are positioned on opposite sides of the engine 20, the generator 30, and the air driver 40, so as to reflect and reduce noise produced by the engine 20, the generator 30, and the air driver 40. In some embodiments, a position (e.g., an angular position, a length, etc.) of the first deflector assembly 202 and the second deflector assembly 204 is adjustable within the enclosure 100 to reduce exported noise. Additional aspects of the structure of the first deflector assembly 202 and the second deflector assembly 204 may be found in U.S. Patent Application No. 62/944,943, filed Dec. 6, 2019, the entire disclosure of which is hereby incorporated by reference herein. As shown in FIGS. 1-3, the enclosure 100 also includes an exterior deflector assembly 206 mounted to an air outlet assembly along a perimeter edge of the air outlet 116. The exterior deflector assembly 206 extends in a lateral direction (e.g., into and out of the page as shown in FIG. 3) along the perimeter edge and from the perimeter edge at an angle into a space above the air outlet 116. The exterior deflector assembly 206 further attenuates exported noise by redirecting sound waves leaving through the air outlet 116. The exterior deflector assembly 206 may also act as a rain shield for at least a portion of the air outlet 116.

As shown in FIGS. 1-3, the enclosure 100 is formed entirely from a plurality of individual structural components that are interconnected using standard mechanical fasteners (e.g., bolts, screws, etc.), which facilitates transport of the enclosure 100 to the end use location and allows the enclosure to be 100 field-erected on-site without welding or other complex assembly operations. As shown in FIGS. 1-2, the enclosure includes a main body portion 120, an air inlet portion 122, and an air outlet portion 124. In other embodiments, only a portion of the enclosure 100 may be formed from the individual structural components (e.g., the individual structural components may be used to expand an existing enclosure to accommodate new and/or different components, etc.). The main body portion 120 is formed by multiple segments 126 that are arranged in series (e.g., end to end, etc.) along a longitudinal direction (e.g., left-to-right as shown in FIG. 3, substantially parallel to a flow direction through the main body portion 120, etc.). The air inlet portion 122 and the air outlet portion 124 are disposed on the container roof 106, on opposing ends of the container roof 106. A width of each of the air inlet portion 122 and the air outlet portion 124 is approximately the same as a width of the main body portion 120 such that the air inlet portion 122 and the air outlet portion 124 each extend between opposing lateral ends of the container roof 106 (e.g., between the first pair of container sidewalls 108 such that the perimeter walls of the air inlet portion 122 and the air outlet portion 124 are substantially flush with the first plurality of container sidewalls 108). As shown in FIG. 3, a length of the air outlet portion 124 in the longitudinal direction (e.g., left-to-right as shown in FIG. 3) is greater than a length of the air inlet portion 122. In other embodiments, the relative lengths of the air inlet portion 122 and the air outlet portion 124 may be different.

As shown in FIGS. 1-3, the main body portion 120 is formed from 10 individual partially enclosed sidewall segments 126, each extending in a longitudinal direction (e.g., left to right as shown in FIG. 3). The segments 126 each include (i) a single pair of first sidewall panels from the first pair of container sidewalls 108 and (ii) a roof panel. The segments 126 are arranged end-to-end in substantially coaxial arrangement along the longitudinal direction. The segments 126 together form the internal volume 103 of the enclosure 100. The number of segments 126 used to form the enclosure 100 may differ in various embodiments and depending on the size of the generator 30 and/or other components housed within the enclosure 100.

Figure 7:
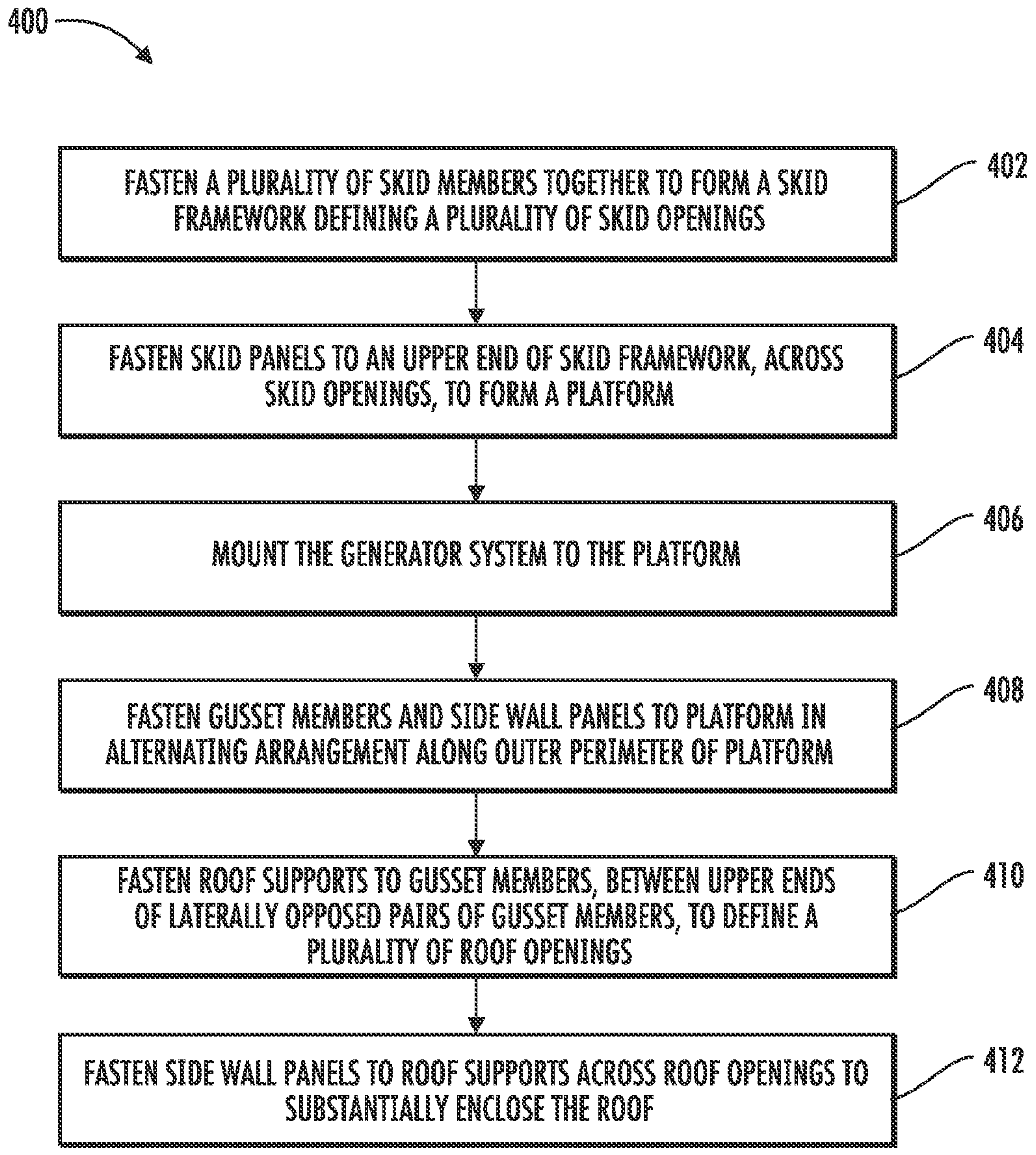
FIG. 7 is a flow diagram of a method of making a genset enclosure, according to an embodiment.

Referring now to FIG. 7, a method 400 of making a genset enclosure is shown, according to an embodiment. The enclosure may be the same as or similar to the enclosure 100 described with reference to FIGS. 1-3 and/or the enclosure 100' described with reference to FIGS. 4-6. As such, similar numbering will be used to identify similar components. FIGS. 8-29 detail different stages of the assembly process described by method 400, according to at least one embodiment.

Figure 8:
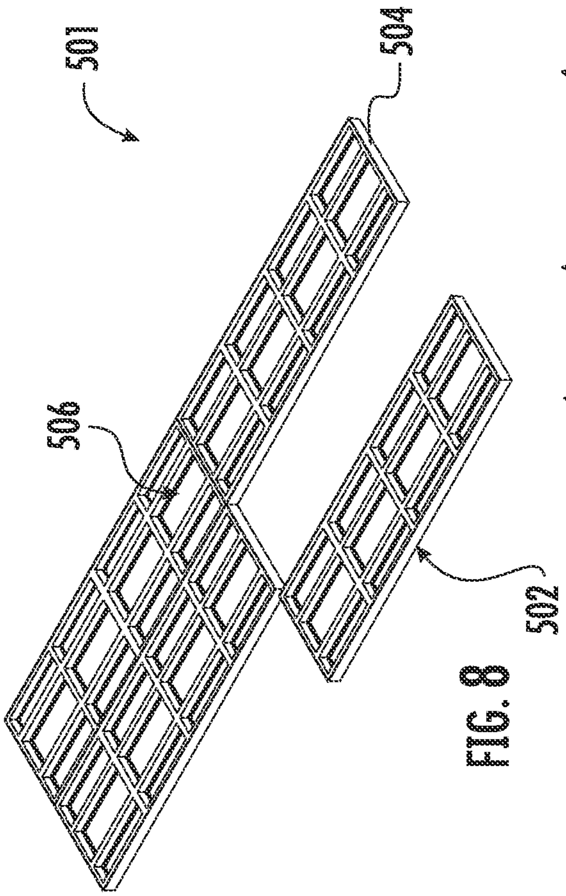
FIG. 8 is a perspective view of a partially assembled skid framework for a genset enclosure, according to an embodiment.
Figure 9:
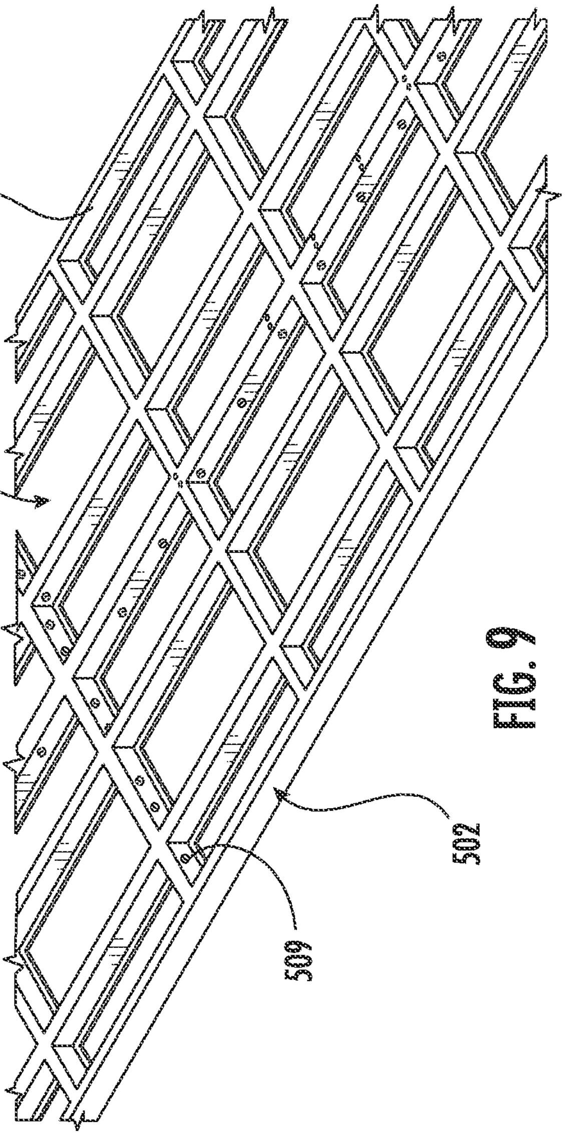
FIG. 9 is a perspective view of a fully assembled skid framework for a genset enclosure, according to an embodiment.

The method 400 starts by assembling a skid platform subassembly for the genset enclosure. At operation 402, a plurality of skid members 502 are fastened together to form a skid framework 501. As shown in FIG. 8, the skid members 502 include frame elements 504 that define a base of the enclosure 100. Operation 402 may include coupling multiple individual frame elements to produce each skid member 502; for example, by welding or otherwise pre-fastening individual frame elements 504 together at opposing ends of the frame elements 504. The frame elements 504 may be channel frames made of I, C, and/or T channels that are welded or otherwise coupled together to form a skeleton of the skid members 502, or other suitable frame configurations, or any combination thereof. As shown in FIG. 8, each of the skid members 502 defines a plurality of skid openings 506 between the frame elements 504. As shown in FIG. 8, operation 402 may include positioning the skid members 502 adjacent to one another such that the skid members 502 engage with one another along an outer perimeter of each of the skid members 502. Operation 402 includes fastening the skid members 502 at their outer ends to form the skid framework 501. As shown in FIG. 9, fasteners include a plurality of bolts 509 that extend through openings in adjacent skid members 502. In other embodiments, the fasteners may include screws, rivets, clips, and/or other suitable connectors. Among other benefits, the size of the skid framework 501 may be easily adjusted by attaching additional skid members 502 to the outer ends of the skid framework 501.

Figure 10:
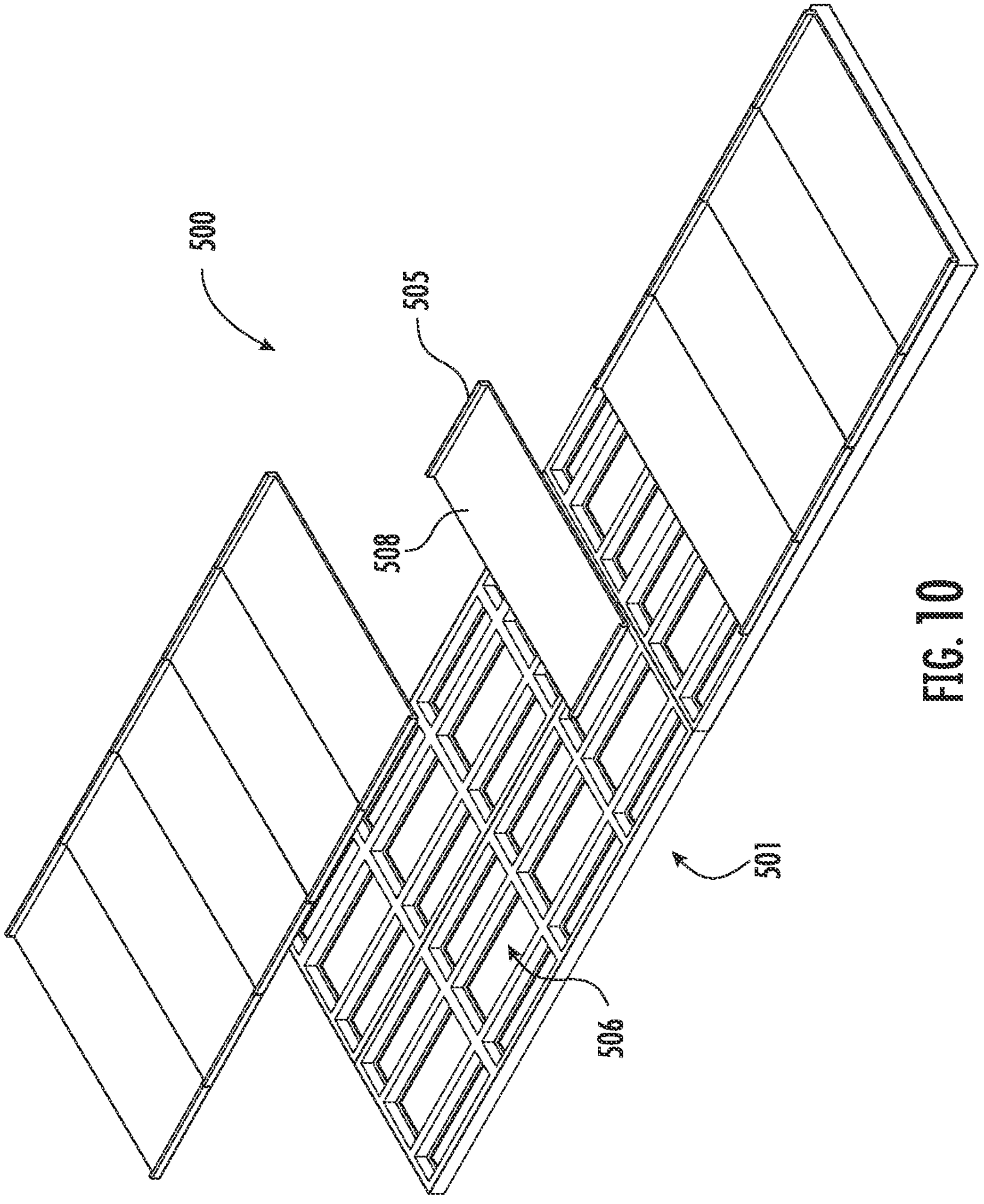
FIG. 10 is a perspective view of a partially assembled skid platform for a genset enclosure, according to an embodiment.

At 404, skid panels 508 are fastened to the skid framework 501 to form a skid platform 500. Operation 404 is depicted in FIG. 10, according to at least one embodiment. Operation 404 includes applying the skid panels 508 to an upper end of the skid framework 501, across the skid openings 506 so as to form the container floor 104 of the enclosure 100 (see FIG. 3). In one embodiment, operation 404 includes centering each skid panel 508 with respect to the skid framework 501 (e.g., with respect to a central/longitudinal axis of the skid framework 501); for example, by aligning the outer ends of each skid panel 508 with the outermost frame element 504 (e.g., such that the outer ends of each skid panel 508 are substantially flush with the outer edges of the skid framework 501). Operation 404 may also include fastening each skid panel 508 to the skid framework 501. For example, operation 404 may include bolting the skid panels 508 to the individual frame elements 504, by passing bolts or another suitable mechanical fastener through aligned openings between the skid panels 508 and an upper flange of the frame elements 504.

Figure 11:
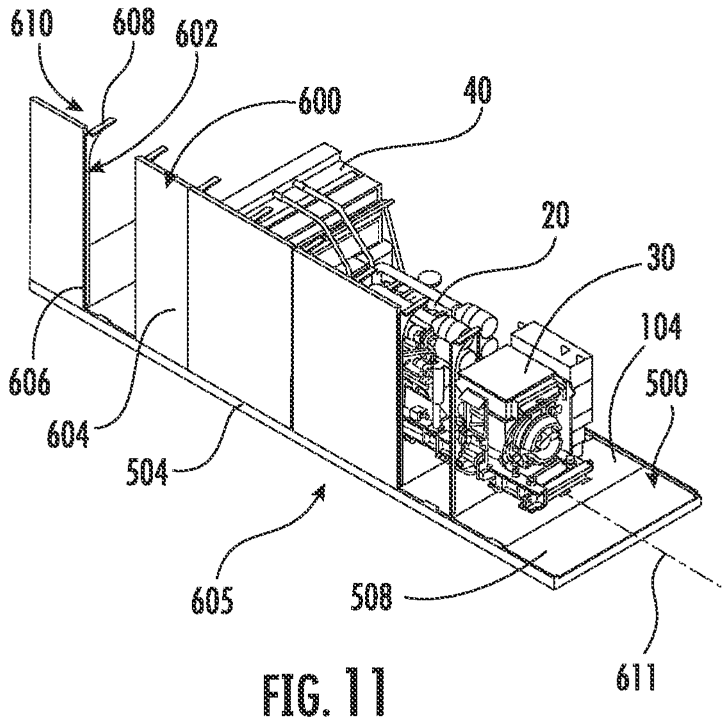
FIG. 11 is a perspective view of a partially assembled skid platform and sidewall structure for a genset enclosure, according to an embodiment.

At 406, the generator system including the engine 20, the generator 30, and the air driver 40 is mounted to the skid platform 500. As shown in FIG. 11, each of these internal components of the genset assembly may be provided in the form of component modules that include the component and a support structure to facilitate transport of the component. Operation 406 may include aligning the separate component modules for the engine 20, the generator 30, and the air driver 40 to the skid platform 500; for example, using a crane to position each component module onto an upper surface of the skid platform 500 (e.g., onto the container floor 104 formed by the skid panels 508). The support structure for each component module may include a support skid (e.g., framework, etc.) positioned beneath the component to facilitate transport of the component module and repositioning of the component module onto the skid platform 500. Operation 406 may also include fastening each component module to the container floor 104, for example, by bolting the support skid of each component module to one or more skid panels 508 and/or frame elements 504 of the skid platform 500. Operation 406 may additionally include connecting the engine 20, generator 30, air driver 40, and/or any other assembly components together to form the genset. Operation 406 may further include mounting auxiliary components to the skid platform 500 such as cooling equipment, components of the exhaust assembly 50, and/or other components.

Figure 12:
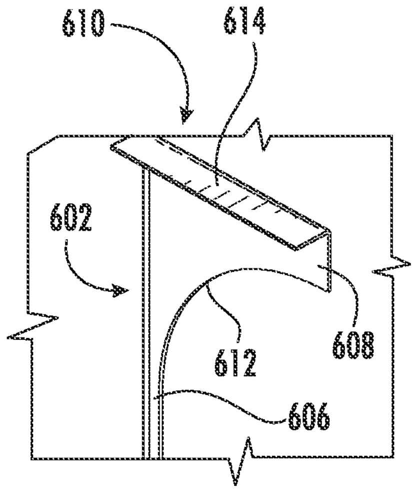
FIG. 12 is a perspective view of an upper end of a gusset member of the sidewall structure of FIG. 11.

At 408, a sidewall structure 600 of the enclosure 100 is formed to at least partially enclose the space above the skid platform 500. As shown in FIG. 11, the sidewall structure 600 includes a plurality of gusset members 602 and a first plurality of sidewall panels 604 positioned in alternating arrangement along an outer perimeter of the skid platform 500. As shown in FIGS. 11-12, the gusset members 602 are generally "L" shaped elements including (i) a first portion 606 extending upwardly from the skid platform 500 in substantially perpendicular orientation relative to an upper surface of the skid platform 500 (e.g., normal to skid panels 508, etc.); and (ii) a second portion 608 disposed at an upper end 610 of the first portion 606 and extending normal to the first portion 606 and toward a centerline 611 (e.g., longitudinal axis, etc.) of the skid platform 500. As shown in FIG. 12, a lower edge 612 of each gusset member 602 may include an arcuate 90° transition between the first portion 606 and the second portion 608 forming a triangular shape at the upper end of the gusset member 602. Each gusset member 602 may further include and/or define a flange 614 extending from an upper edge of the second portion 608 and normal to the first portion 606 and the second portion 608. As shown in FIG. 12, the flange 614 is oriented substantially parallel to the container floor 104. In one embodiment, as shown in FIG. 12, each gusset member 602 is formed from a stamped sheet of steel, aluminum, or another suitable material that is bent along its upper edge to form the flange 614.

Operation 408 may include positioning a lower end of each gusset member 602 between adjacent ones of the skid panels 508 such that a portion of the gusset members 602 are "sandwiched" or otherwise disposed between the skid panels 508. Operation 408 may include arranging the gusset members 602 in opposed pairs 603 positioned on opposite lateral ends 605 of the skid platform 500. In at least one embodiment, operation 408 includes orienting at least one gusset member such that (i) a first portion of the gusset member extends upwardly from the skid platform normal to an upper surface of the skid platform (e.g., arranging the first portion in substantially perpendicular orientation with respect to an upper surface of the skid platform), and (ii) a second portion of the gusset member, extending normal to the first portion, extends toward a centerline of the skid platform. Operation 408 may further include positioning the first plurality of sidewall panels 604 between the gusset members 602 such that each gusset member 602 is at least partially "sandwiched" or otherwise disposed between adjacent ones of the first plurality of sidewall panels 604. The gusset members 602 (and sidewall panels 604) may be spaced in equal intervals along the length of the skid platform 500. In another embodiment, the spacing between two or more gusset members 602 may be different from the remaining gusset members 602 (e.g., the gusset members 602 may be spaced at unequal intervals). Among other benefits, maintaining a consistent spacing between gusset members 602 allows for quick and easy repositioning of doors and sidewall panels to different portions of the enclosure 100.

Figure 13:
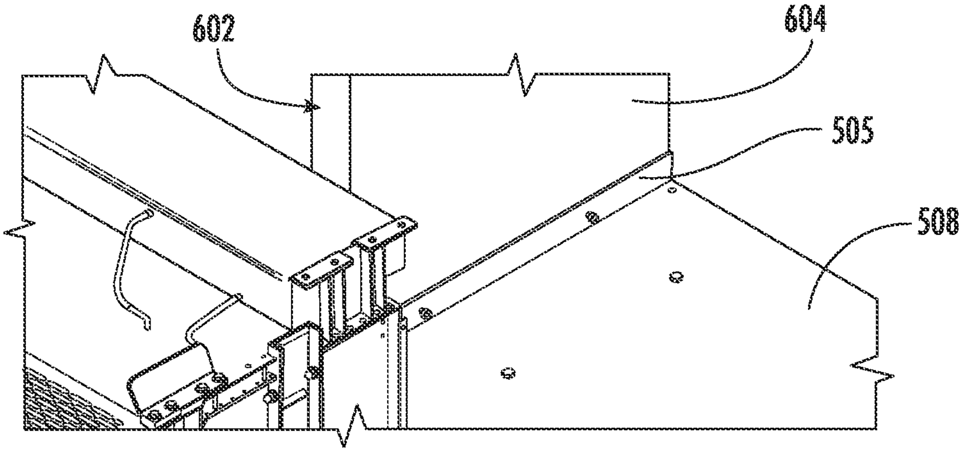
FIG. 13 is a perspective view of a connection portion of the sidewall structure of FIG. 11.
Figure 14:
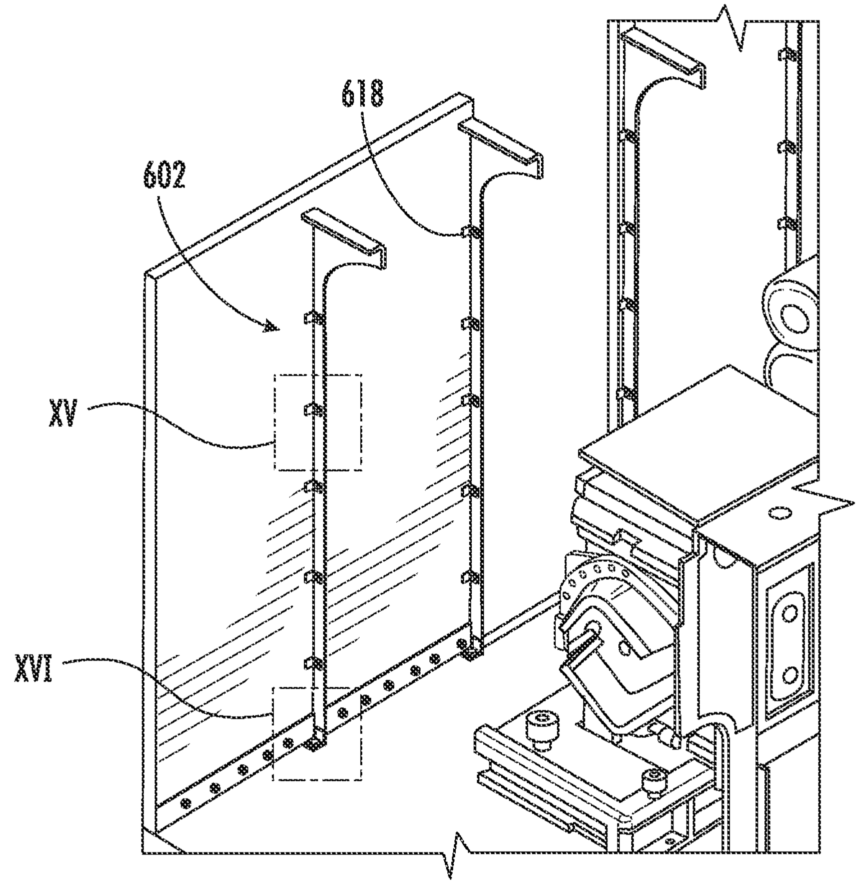
FIG. 14 is another perspective view of the partially assembled skid platform and sidewall structure of FIG. 11.
Figure 15:
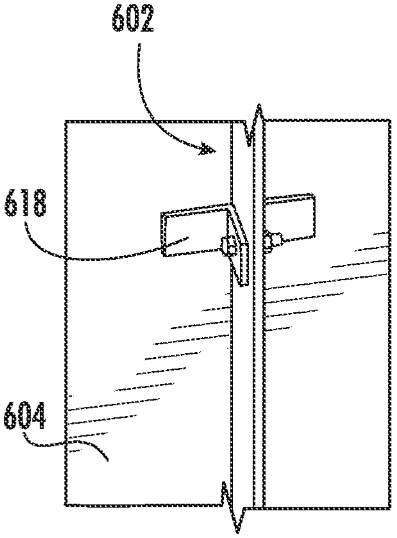
FIG. 15 is a perspective view of a middle connection portion of a gusset member of the sidewall structure of FIG. 11.
Figure 16:
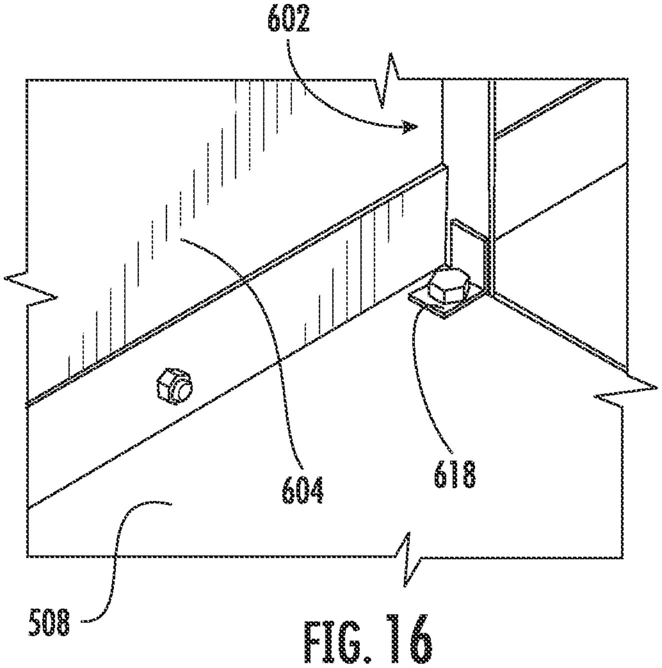
FIG. 16 is a perspective view of a lower connection portion of the gusset member of FIG. 15.

Operation 408 may further include fastening a lower end of each of the gusset members 602 (e.g., a lower end of first portion 606) and the first plurality of sidewall panels 604 to the skid platform 500. For example, as shown in FIG. 13, operation 408 may include engaging a lower end of each of the first plurality of sidewall panels 604 with an upwardly bent edge 505 of a respective one of the skid panels 508, and fastening the lower end to the upwardly bent edge 505 (e.g., via bolts or another suitable mechanical fastener). Operation 408 may further include fastening each of the gusset members 602 to an adjacent one of the first plurality of sidewall panels 604 and at least one of the skid panels 508; for example, by fastening a plurality of angle brackets 618 (e.g., L-brackets, etc.) to the gusset member 602 (e.g., to opposing sides of each gusset member 602), between the gusset member 602 and adjacent sidewall panels 604, and between a protruding portion of a lower end of each gusset member 602 and the skid panel 508 (see FIGS. 14-16).

Figure 17:
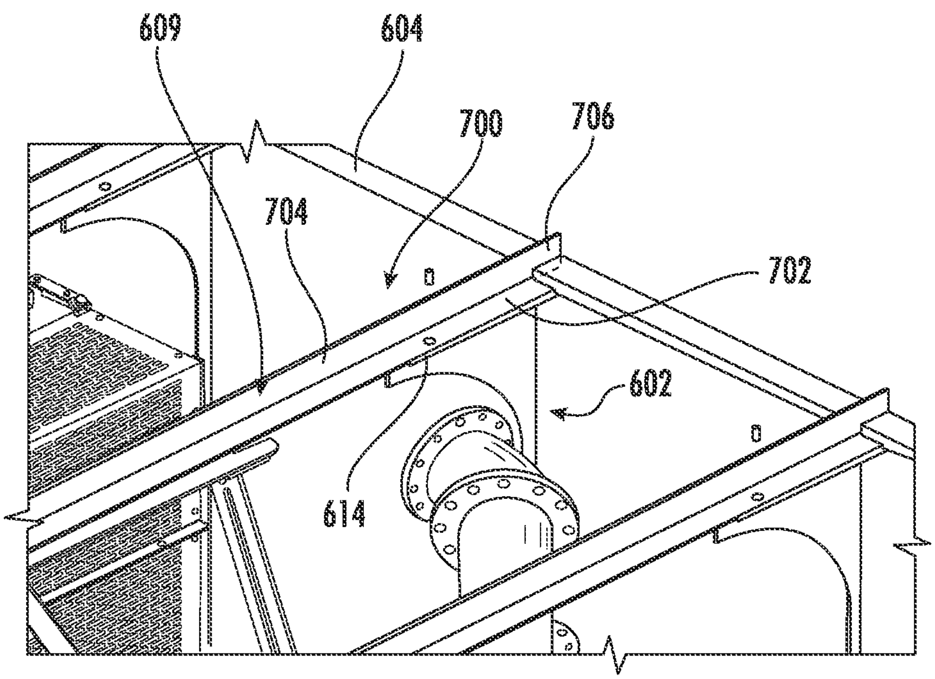
FIG. 17 is a perspective view of a partially assembled roof support structure of a genset enclosure, according to an embodiment.
Figure 18:
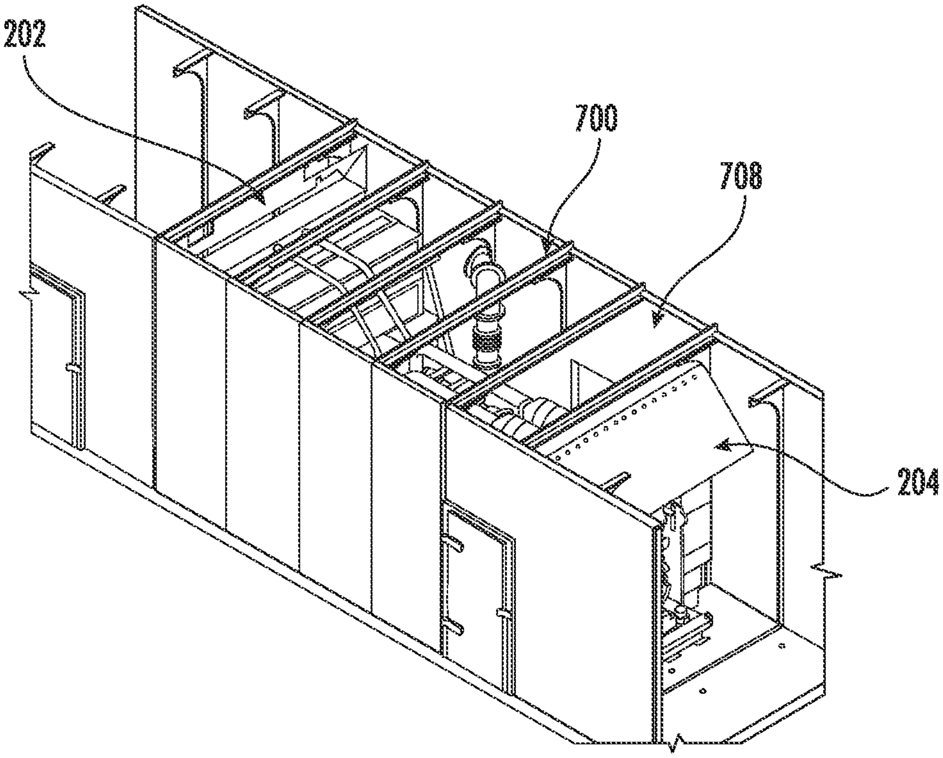
FIG. 18 is another perspective view of the partially assembled roof support structure of FIG. 17.

At 410, a plurality of roof supports 700 are fastened to the gusset members 602 to stabilize the structural walls on each lateral end of the enclosure 100 and to support the container roof 106. Together, the roof supports 700 and the gusset members 602 form a skeletal framework 609 (see FIG. 17). As shown in FIG. 17, each roof support 700 is an "L" shaped bracket (e.g., angle iron, etc.) that includes a first leg 702 and a second leg 704 extending from an edge of the first leg 702 normal to the first leg 702. In the embodiment of FIG. 17, the outer ends 706 of the second leg 704 protrude beyond the outer ends of the first leg 702. Operation 410 may include engaging the first leg 702 with a respective one of the opposed pairs 603 of gusset members 602 (e.g., at flanges 614) and inserting the outer ends 706 of the second leg 704 into a slot formed between adjacent ones of the first plurality of sidewall panels 604 (such that at least a portion of the outer ends 706 is "sandwiched" or otherwise disposed between adjacent sidewall panels 604 above the gusset members 602). Operation 410 may further include fastening the roof supports 700 (e.g., first leg 702) to the flanges 614 at the upper end of the gusset members 602 using bolts and/or another suitable mechanical fastener. As shown in FIG. 18, the plurality of roof supports 700 and the sidewall panels 604 together define a plurality of roof openings 708.

In one embodiment, operation 410 further includes fastening or otherwise coupling the first deflector assembly 202 and the second deflector assembly 204 to a respective one of the plurality of roof supports 700 (see FIG. 18). In other embodiments, at least one deflector assembly 202, 204 is coupled to another portion of the container roof (e.g., a second plurality of sidewall panels 604', as described with reference to operation 412).

Figure 19:
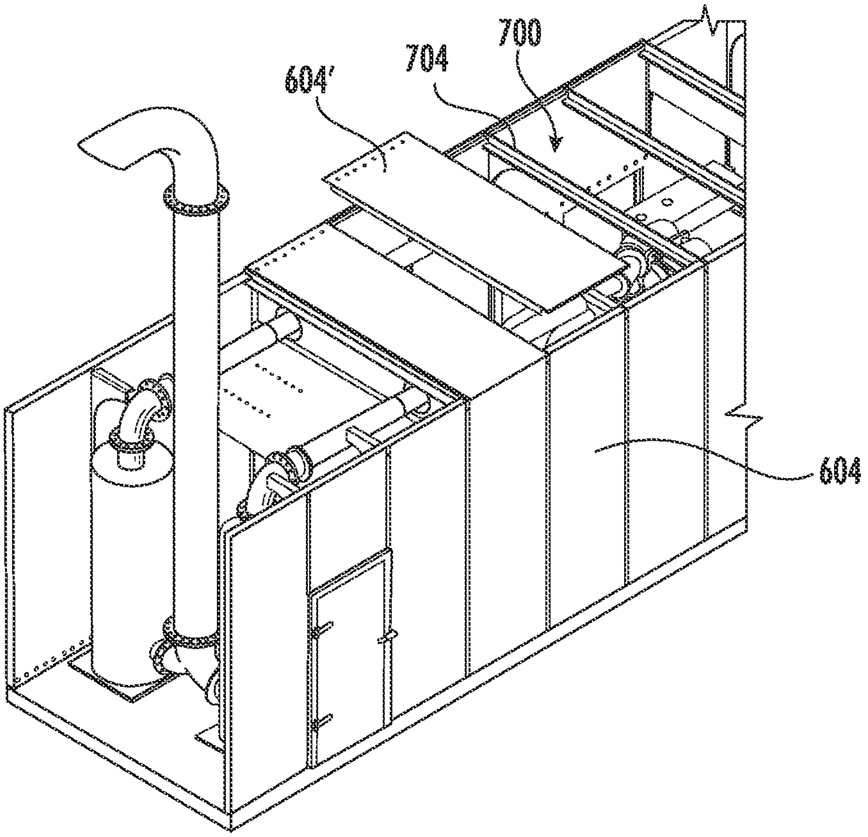
FIG. 19 is a perspective view of a partially assembled roof wall structure of a genset enclosure, according to an embodiment.

At 412, a second plurality of sidewall panels 604' are fastened to the roof supports 700 and/or to the upper edge of the first plurality of sidewall panels 604. In the embodiment of FIG. 19, the second plurality of sidewall panels 604' are the same as the first plurality of sidewall panels 604 (e.g., the panels 604, 604' are of the same size and are of the same design). In other embodiments, the size and/or structure of the panels 604, 604' may be different. Operation 412 may include applying the second plurality of sidewall panels 604' to a roof area of the enclosure 100, across the plurality of roof openings 708 and in between adjacent ones of the plurality of roof supports 700 (i.e., inserting the second plurality of sidewall panels 604' into a respective one of the roof openings 708), such that the second leg 704 of each roof support 700 is "sandwiched" or otherwise disposed between adjacent ones of the second plurality of sidewall panels 604'. The second leg 704 may be sized such that it protrudes upwardly from the second plurality of sidewall panels 604' when the sidewall panels 604' are fully inserted into the roof openings 708, which facilitates sealing of the seams between adjacent sidewall panels 604', as will be further described. The first plurality of sidewall panels 604 and the second plurality of sidewall panels 604' together define an enclosed volume for housing working components of the genset assembly 10. Operation 412 may further include fastening the second plurality of sidewall panels 604' to the roof supports 700 (e.g., the first leg 702) and/or the first plurality of sidewall panels 604 using bolts and/or another mechanical fastener. In other embodiments, the method 400 may include additional, fewer, and/or different operations.

Figure 20:
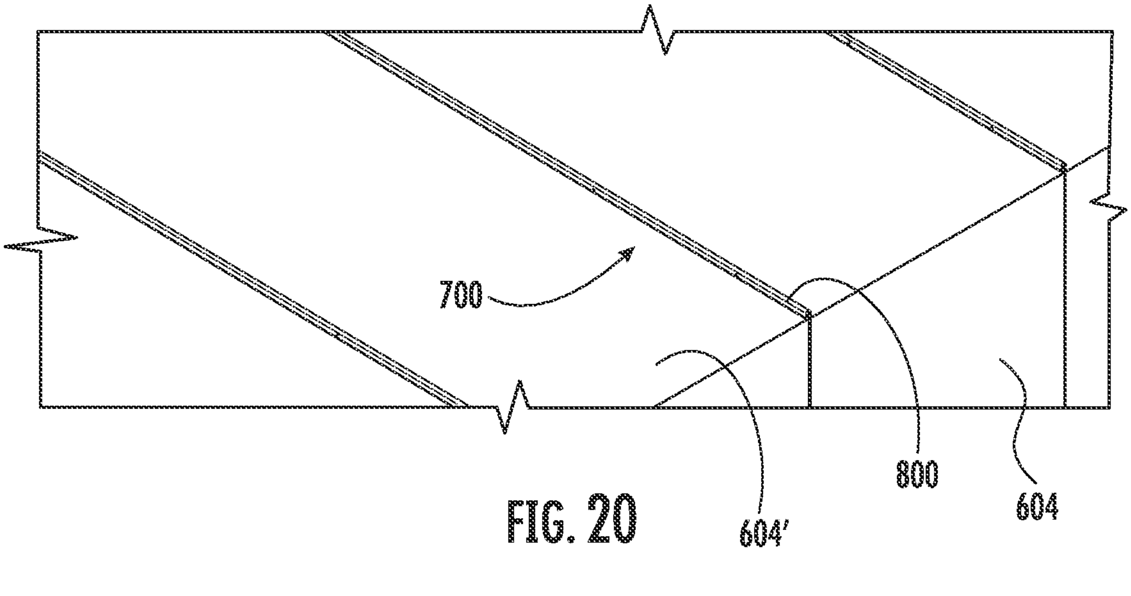
FIG. 20 is a perspective view of a sealing structure for the roof wall structure of FIG. 19.

In one embodiment, operation 412 may further include sealing at least one seam formed between adjacent ones of the first plurality of sidewall panels 604 and the second plurality of sidewall panels 604'. As shown in FIG. 20, a method of sealing the seam between adjacent ones of the second plurality of sidewall panels 604' includes engaging a seal member 800 with the second leg 704 of the roof support 700, along an upper edge of the second leg 704, and folding the seal member 800 over the second leg 704 such that the opposing ends of the seal member 800 (e.g., opposing ends on either side of the second leg 704) extend into the seam formed between the second leg 704 and adjacent ones of the second plurality of sidewall panels 604'. The method of sealing may further include fastening the seal member 800 to the second leg 704 (e.g., via adhesive, bolts, or another suitable mechanical fastener). In other embodiments, an adhesive sealing product (e.g., silicone, etc.) may be used to provide a weather-proof seal for the enclosure 100.

Figure 21:
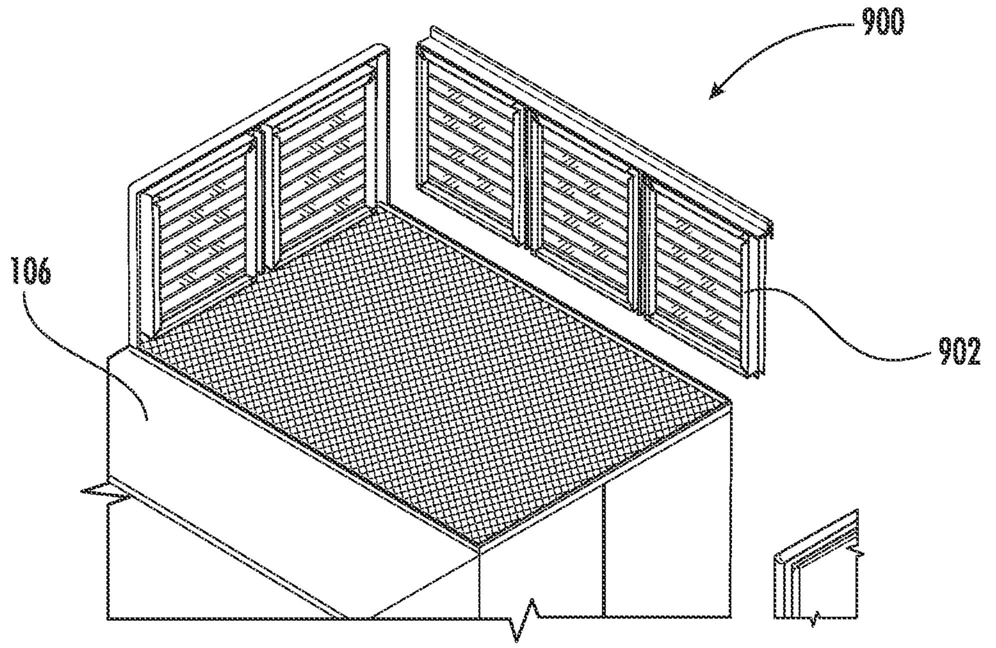
FIG. 21 is a perspective view of a partially assembled intake vent assembly of a genset enclosure during a first assembly operation, according to an embodiment.
Figure 22:
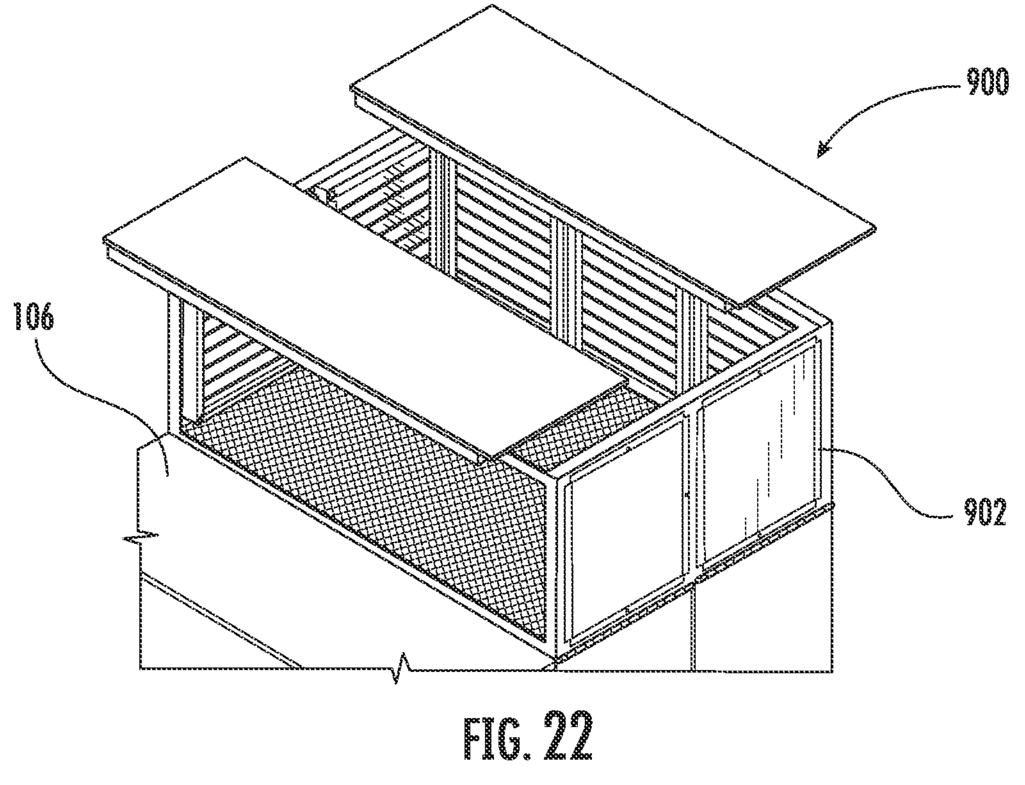
FIG. 22 is a perspective view of a partially assembled intake vent assembly of a genset enclosure during a second assembly operation, according to an embodiment.

In one embodiment, the method of making a genset enclosure 100 further includes assembling the air inlet assembly (e.g., air inlet portion 122) and the air outlet assembly (e.g., air outlet portion 124) onto a container roof 106 of the enclosure 100. For example, FIGS. 21-22 show an air inlet assembly 900 in different stages of construction. The method of making the air inlet assembly 900 may include arranging inlet vent panels 902 along the container roof 106, and along an outer perimeter edge of an inlet opening of the container roof 106. The inlet vent panels 902 may include louvers that allow air to flow substantially freely therethrough, while reducing the likelihood of water ingestion into the enclosure 100. The inlet vent panels 902 may be arranged to direct airflow radially inwardly toward a central axis of the inlet opening. The method of making the air inlet assembly 900 may further include applying sidewall panels (e.g., sidewall panels 604, 604') across the inlet vent panels 902 to cover the inlet opening (FIG. 22).

Figure 23:
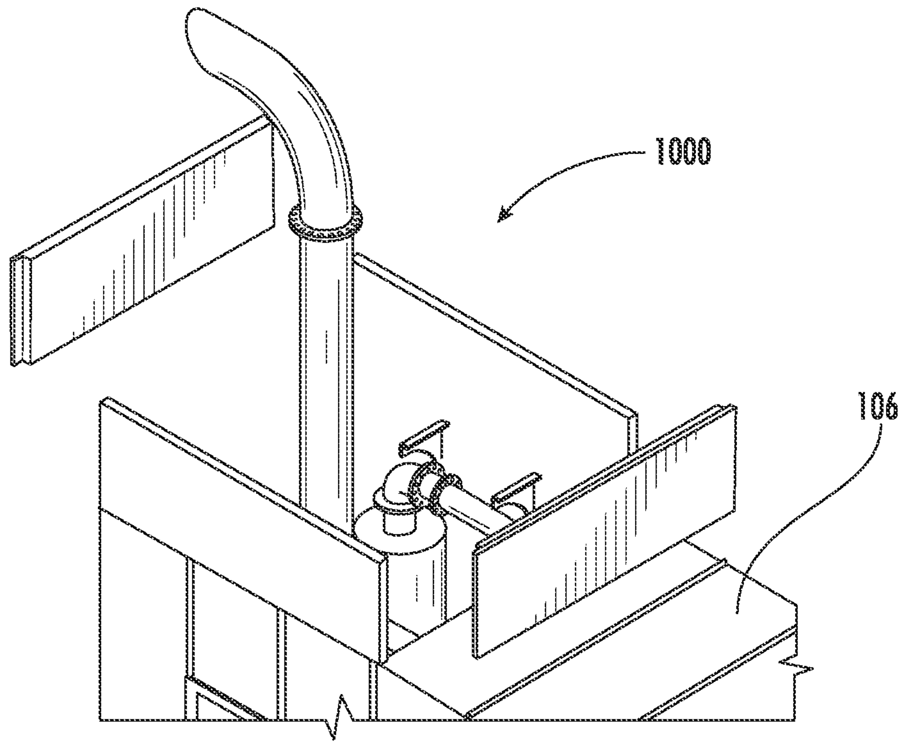
FIG. 23 is a perspective view of a partially assembled exhaust vent assembly of a genset enclosure during a first assembly operation, according to an embodiment.
Figure 24:
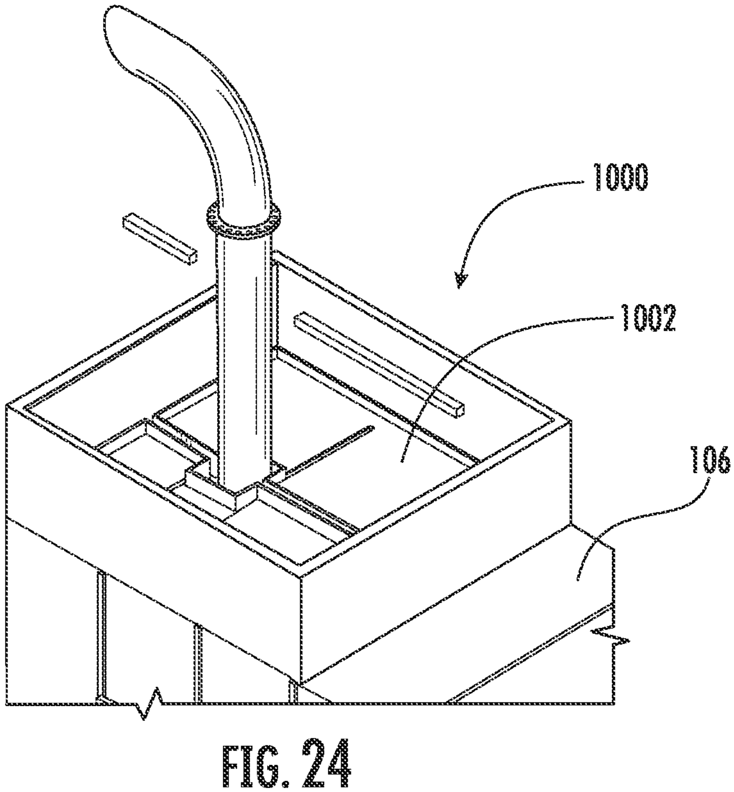
FIG. 24 is a perspective view of a partially assembled exhaust vent assembly of a genset enclosure during a second assembly operation, according to an embodiment.

FIGS. 23-24 show a method of making an exhaust vent assembly 1000 for the genset enclosure 100. The method includes arranging sidewall panels (e.g., sidewall panels 604, 604') along the container roof 106, on an opposite end of the container roof 106 as the air inlet assembly 900 (see FIGS. 21-22). The method may include arranging the sidewall panels along an outer perimeter edge of an outlet opening defined by the container roof 106 such that the sidewall panels extend upwardly from the container roof 106 normal to the container roof 106 (FIG. 23). The method may further include applying a grate 1002 and/or other material to an area circumscribed by the sidewall panels (e.g., to the outlet opening in the container roof 106, as shown in FIG. 24).

Figure 25:
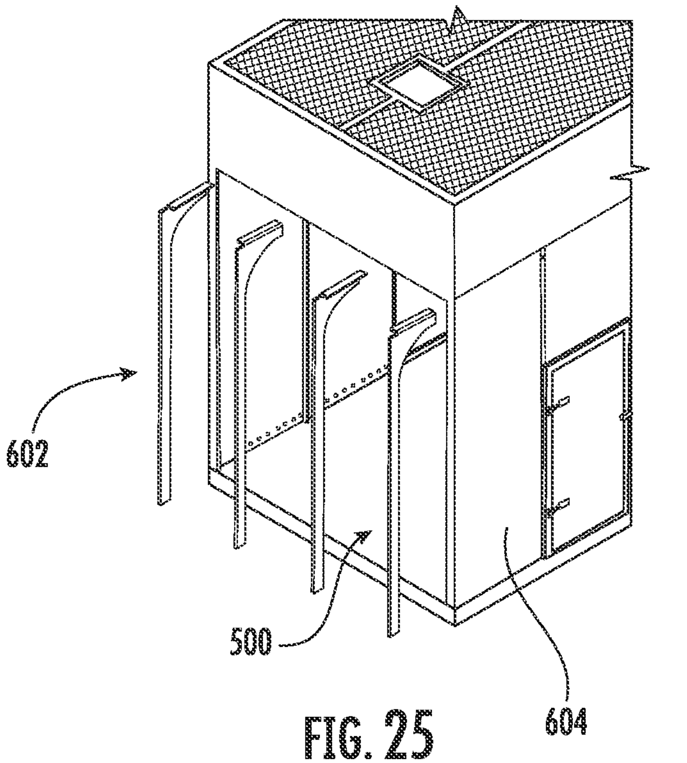
FIG. 25 is a perspective view of a gusset assembly operation of an end wall structure of a genset enclosure, according to an embodiment.
Figure 26:
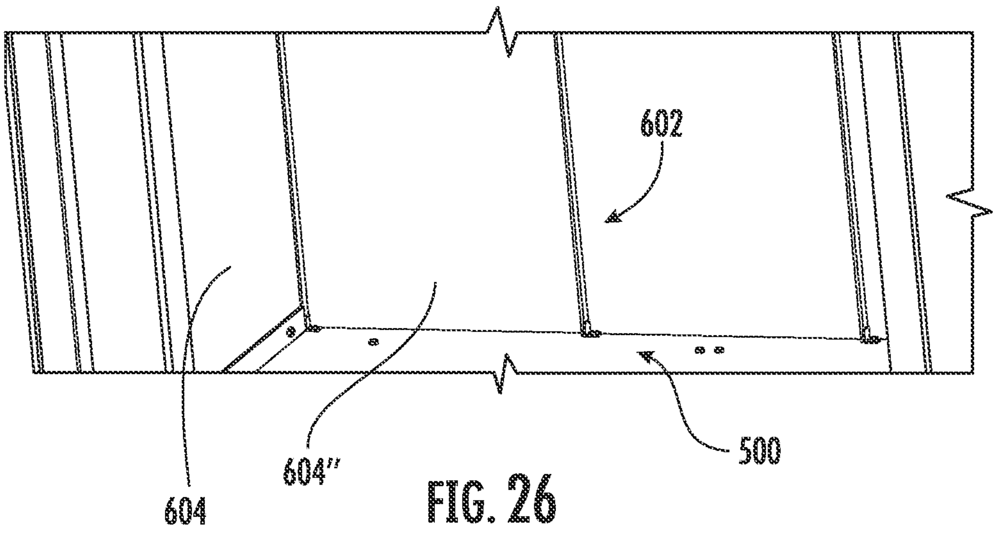
FIG. 26 is a perspective view of a lower connection portion of the end wall structure of FIG. 25.

In one embodiment, the method of making the genset enclosure 100 further includes constructing an end wall structure to enclose the longitudinal ends of the enclosure 100. The method may be the same as or similar to operation 408 of method 400 (see FIG. 7). As shown in FIGS. 25-26 the method includes positioning gusset members 602 and a third plurality of sidewall panels 604" in alternating arrangement along each longitudinal end of the enclosure 100. As shown in FIG. 25, the method may include engaging at least one gusset member 602 with an interior surface of one of the first plurality of sidewall panels 604. As shown in FIG. 26, the method may further include engaging the gusset members 602 and the third plurality of sidewall panels 604" with one, or a combination of, the skid platform 500 and the first plurality of sidewall panels 604.

Figure 27:
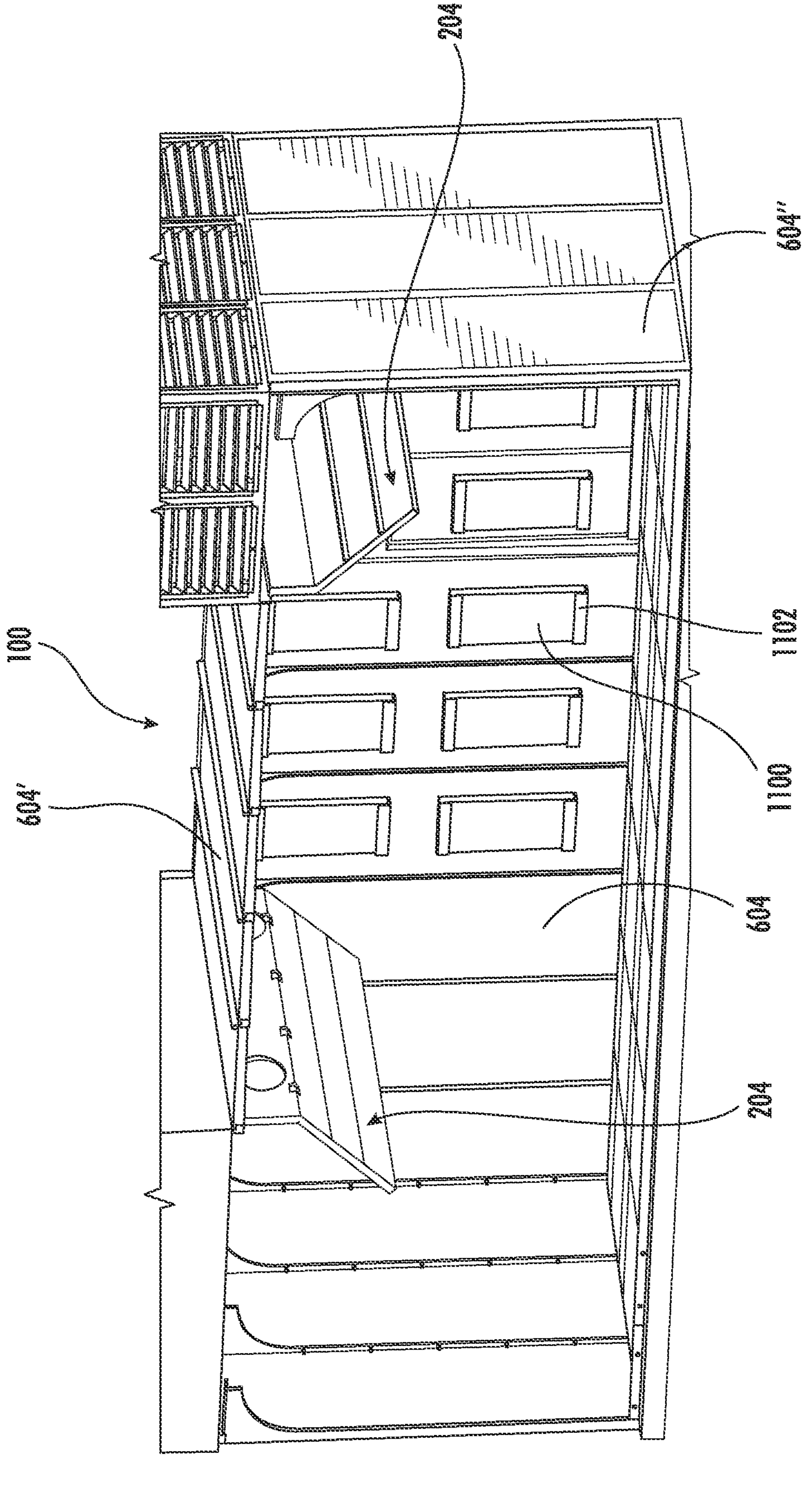
FIG. 27 is a perspective cross-sectional view of a partially assembled genset enclosure, according to an embodiment.
Figure 28:
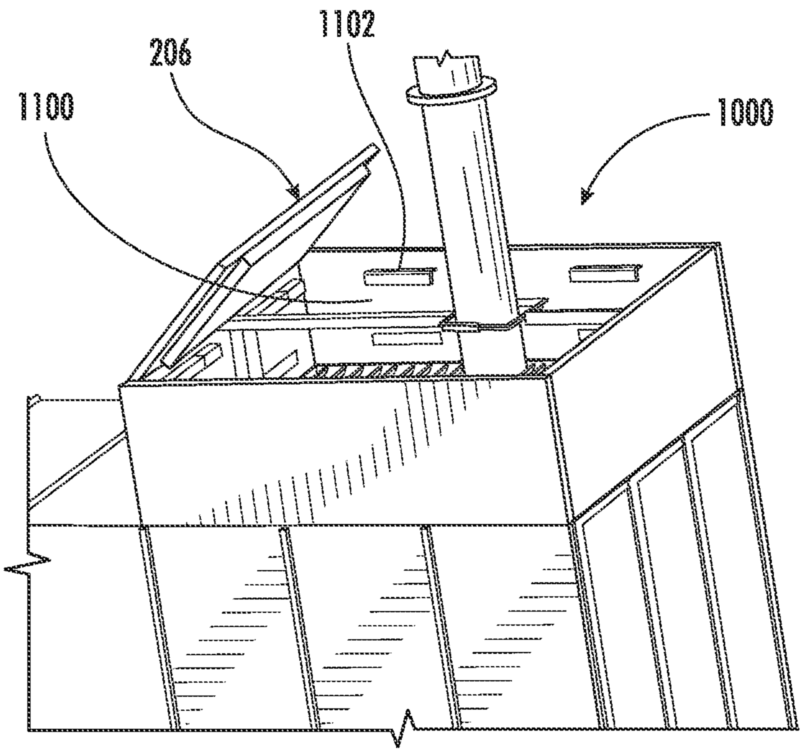
FIG. 28 is a partial perspective view of a partially assembled exhaust vent assembly of a genset enclosure, according to an embodiment.
Figure 29:
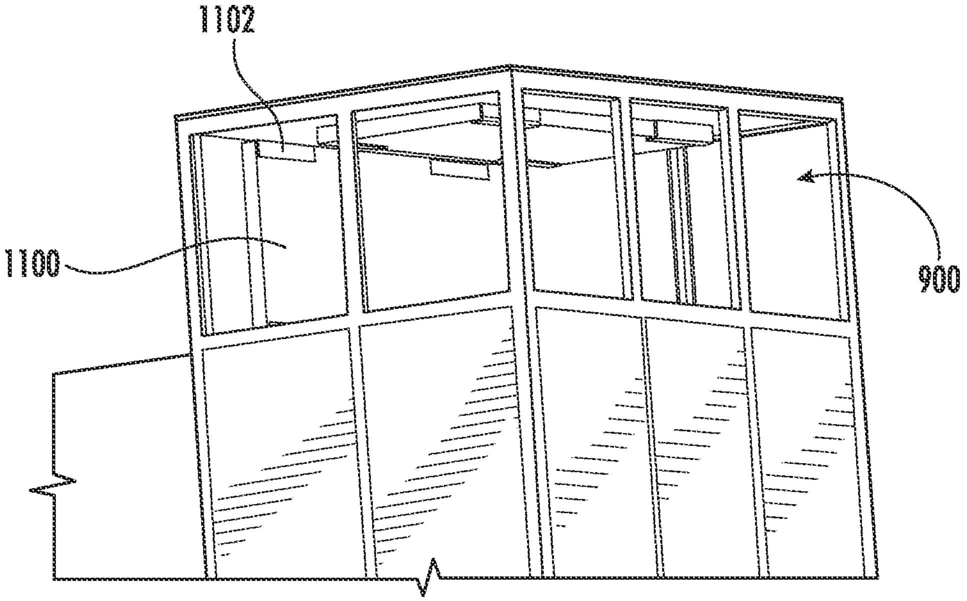
FIG. 29 is a partial perspective view of a partially assembled intake vent assembly of a genset enclosure, according to an embodiment.

In one embodiment, the method of making the genset enclosure 100 further includes applying acoustic dampening materials to interior surfaces of the enclosure 100. The acoustic dampening materials (e.g., acoustic material lining, etc.) may be structured to absorb and attenuate noise produced by the genset assembly 10 (see FIG. 3). The noise may be generated by internal components such as the engine 20, the generator 30, the air driver 40, or the like (see FIG. 3). Alternatively, or in combination, the noise may be produced as a result of air flow passing through the enclosure 100 via the air inlet 114 and the air outlet 116. In various embodiments, the acoustic damping material 1100 may include fibrous (e.g., rock wool, glass wool, mineral wool, etc.), non-fibrous (e.g., polyurethane foam, melamine foam, etc.) materials, or the like. A method of coupling the acoustic damping materials 1100 is shown in FIGS. 27-29. The method includes attaching a plurality of mounts 1102 (e.g., "C" shaped mounting brackets, etc.) to the interior surfaces of the enclosure 100 (e.g., to the first plurality of sidewall panels 604, the second plurality of sidewall panels 604', the third plurality of sidewall panels 604", the deflector assemblies 202, 204, 206, the air inlet assembly 900, the exhaust vent assembly 1000, and/or other surfaces of the enclosure 100). The mounts 1102 may be mechanically coupled to the interior surfaces using an adhesive product, magnets, rivets, bolts, or another suitable mechanical fastener. The method further includes coupling the acoustic damping materials 1100 to the mounts 1102; for example, by inserting sheets of acoustic damping materials 1100 into the holding structure formed by the mounts 1102.

In at least one embodiment, the genset assembly includes a kit of materials that can be delivered as individual components and assembled on-site to form the desired enclosure geometry. For example, the genset assembly may be a kit including a skid platform subassembly, a plurality of gusset members that are mountable to (e.g., configured to fasten to or otherwise couple to) the skid platform subassembly. The gusset members may each include a first portion and a second portion disposed at an end of the first portion and extending normal to the first portion. The gusset members may also include a flange disposed on the second portion and extending normal to both the first portion and the second portion (e.g., along a reference plane that is oriented normal to a first reference plane aligned with the first portion and a second reference plane aligned with the second portion). The kit may also include a plurality of roof supports having opposing ends that are configured to mount to the plurality of gusset members, and a first and second plurality of sidewall panels that are mountable to the plurality of gusset members and/or the plurality of roof supports. In some embodiments, at least one gusset member of the plurality of gusset members is part of a gusset member assembly (e.g., kit, etc.) that includes a plurality of angle brackets to fasten the gusset members to the skid platform subassembly and/or a respective one of the first plurality of sidewall panels.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A genset enclosure, comprising:
- a skid platform;
- a plurality of gusset members spaced at intervals along an outer perimeter of the skid platform and coupled to the skid platform by fasteners, the plurality of gusset members arranged in opposed pairs positioned on opposite lateral ends of the skid platform, wherein each gusset member defines a first portion extending upwardly from the skid platform normal to an upper surface of the skid platform and a second portion disposed at an upper end of the first portion and extending normal to the first portion and toward a centerline of the skid platform;
- a plurality of roof supports, each roof support extending between at least one of the opposed pairs of gusset members and coupling upper ends of the at least one opposed pair, the plurality of roof supports and the plurality of gusset members together defining a skeletal framework, at least one roof support of the plurality of roof supports comprising an “L” shaped bracket;
- a first plurality of sidewall panels coupled to the plurality of gusset members and the skid platform and extending upwardly from the outer perimeter of the skid platform normal to the upper surface of the skid platform, the first plurality of sidewall panels and the plurality of gusset members positioned in an alternating arrangement along the outer perimeter of the skid platform; and
- a second plurality of sidewall panels coupled to the plurality of roof supports, the first plurality of sidewall panels and the second plurality of sidewall panels together defining an enclosed volume.

2. The genset enclosure of claim 1, wherein the second portion of at least one of the plurality of gusset members comprises a flange disposed on the second portion and extending normal to the first portion and the second portion, the flange coupled to one of the plurality of roof supports.

3. The genset enclosure of claim 1, wherein the first plurality of sidewall panels and the second plurality of sidewall panels are coupled to the skeletal framework by mechanical fasteners.

4. The genset enclosure of claim 1, wherein the at least one roof support is engaged with and disposed between a pair of the first plurality of sidewall panels and a pair of the second plurality of sidewall panels.

5. A genset enclosure, comprising:
- a skid platform;
- a plurality of gusset members spaced at intervals along an outer perimeter of the skid platform and coupled to the skid platform by fasteners, the plurality of gusset members arranged in opposed pairs positioned on opposite lateral ends of the skid platform, wherein each gusset member defines a first portion extending upwardly from the skid platform normal to an upper surface of the skid platform and a second portion disposed at an upper end of the first portion and extending normal to the first portion and toward a centerline of the skid platform;
- a plurality of roof supports, each roof support extending between at least one of the opposed pairs of gusset members and coupling upper ends of the at least one opposed pair, the plurality of roof supports and the plurality of gusset members together defining a skeletal framework, at least one roof support of the plurality of roof supports comprising a first leg and a second leg normal to the first leg;
- a plurality of seal members, at least one of the plurality of seal members coupled to the first leg and extending laterally between one of the opposed pairs of gusset members;
- a first plurality of sidewall panels coupled to the plurality of gusset members and the skid platform and extending upwardly from the outer perimeter of the skid platform normal to the upper surface of the skid platform, the first plurality of sidewall panels and the plurality of gusset members positioned in an alternating arrangement along the outer perimeter of the skid platform; and
- a second plurality of sidewall panels coupled to the plurality of roof supports, the first plurality of sidewall panels and the second plurality of sidewall panels together defining an enclosed volume.

6. The genset enclosure of claim 1, wherein at least one gusset member of the plurality of gusset members is disposed between a pair of the first plurality of sidewall panels.

7. The genset enclosure of claim 1, wherein the gusset members are spaced at equal intervals.

8. The genset enclosure of claim 1, wherein the gusset members are spaced at unequal intervals.

9. The genset enclosure of claim 1, wherein the first plurality of sidewall panels is substantially aligned with the second plurality of sidewall panels along a longitudinal direction.

10. The genset enclosure of claim 1, wherein at least one of the plurality of gusset members is coupled to a respective one of the first plurality of sidewall panels and the skid platform by a plurality of angle brackets.

11. The genset enclosure of claim 1, wherein the skid platform comprises:
- a plurality of skid members that are fastened together to form a skid framework; and
- a plurality of skid panels fastened to an upper end of the skid framework.

12. A method of making a genset enclosure, comprising:
providing a skid platform;
mounting a generator system to the skid platform;
fastening a plurality of gusset members to the skid platform at intervals along an outer perimeter of the skid platform;
fastening a first plurality of sidewall panels to the plurality of gusset members and the skid platform;
fastening a plurality of roof supports to the plurality of gusset members, between upper ends of laterally opposed pairs of the plurality of gusset members, to define a skeletal framework; and
fastening a second plurality of sidewall panels to the plurality of roof supports to define an at least partially enclosed volume between the second plurality of sidewall panels and the skid platform; and
sealing at least one seam formed between adjacent ones of the second plurality of sidewall panels by engaging a seal member with an upper edge of a respective one of the plurality of roof supports and folding the seal member over the upper edge such that opposing ends of the seal member extend into the at least one seam.

13. The method of claim 12, wherein fastening the plurality of gusset members to the skid platform comprises positioning the plurality of gusset members in opposed pairs on opposite lateral ends of the skid platform, and orienting at least one gusset member of the plurality of gusset members such that:
a first portion of the at least one gusset member extends upwardly from the skid platform normal to an upper surface of the skid platform, and
a second portion of the at least one gusset member, extending normal to the first portion, extends toward a centerline of the skid platform.

14. The method of claim 13, wherein fastening at least one roof support of the plurality of roof supports to the at least one gusset member comprises engaging the at least one roof support with a flange of the at least one gusset member, the flange extending normal to both the second portion and the first portion of the at least one gusset member.

15. The method of claim 12, wherein fastening the first plurality of sidewall panels to the plurality of gusset members comprises positioning the first plurality of sidewall panels in alternating arrangement with respect to the plurality of gusset members and inserting the first plurality of sidewall panels into openings defined between adjacent ones of the plurality of gusset members.

16. The method of claim 12, wherein providing the skid platform comprises:
fastening together a plurality of skid members to form a skid framework defining a plurality of skid openings; and
fastening skid panels to an upper end of the skid framework across the skid openings.

17. A genset enclosure, comprising:
a skid platform subassembly;
a plurality of gusset members that are mountable to the skid platform subassembly, at least one of the plurality of gusset members comprising:
a first portion;
a second portion disposed at an end of the first portion and extending normal to the first portion; and
a flange disposed on the second portion and extending normal to the first portion and the second portion;
a plurality of roof supports that are mountable to the plurality of gusset members, each roof support of the plurality of roof supports comprising a first leg and a second leg normal to the first leg;
a first plurality of sidewall panels that are mountable to the plurality of gusset members; and
a second plurality of sidewall panels that are mountable to the plurality of roof supports.

18. The genset enclosure of claim 17, wherein the genset enclosure further comprises a plurality of seal members that are mountable to the first leg and are configured to be folded over the first leg.

19. The genset enclosure of claim 17, wherein at least one gusset member of the plurality of gusset members is part of a gusset member assembly, the gusset member assembly further comprising a plurality of angle brackets configured to fasten the at least one gusset member to at least one of the skid platform subassembly or a respective one of the first plurality of sidewall panels.

* * * * *